(12) United States Patent
Yamada et al.

(10) Patent No.: US 12,135,431 B2
(45) Date of Patent: Nov. 5, 2024

(54) VIRTUAL IMAGE DISPLAY DEVICE

(71) Applicant: FUJIFILM Corporation, Tokyo (JP)

(72) Inventors: Naoyoshi Yamada, Minamiashigara (JP); Hirofumi Toyama, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/453,152

(22) Filed: Aug. 21, 2023

(65) Prior Publication Data
US 2023/0400694 A1    Dec. 14, 2023

Related U.S. Application Data

(63) Continuation of application No. PCT/JP2022/005273, filed on Feb. 10, 2022.

(30) Foreign Application Priority Data

Feb. 22, 2021  (JP) ................. 2021-026308

(51) Int. Cl.
*G02B 27/01*    (2006.01)
*G02B 5/30*    (2006.01)
(Continued)

(52) U.S. Cl.
CPC ....... *G02B 27/0172* (2013.01); *G02B 5/3016* (2013.01); *G02B 27/0093* (2013.01);
(Continued)

(58) Field of Classification Search
CPC ........ G02B 2027/0123; G02B 27/0093; G02B 27/0172; G02B 27/02; G02B 27/283;
(Continued)

(56) References Cited

U.S. PATENT DOCUMENTS 10,606,349 B1    3/2020    Ouderkirk et al.
2001/0028332 A1    10/2001    Roest
(Continued)

FOREIGN PATENT DOCUMENTS

| JP | 2003-529795 A | 10/2003 |
|---|---|---|
| JP | 2010-526321 A | 7/2010 |
| WO | WO 2020/032943 A1 | 2/2020 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2022/005273, dated Aug. 31, 2023, with an English translation.

(Continued)

*Primary Examiner* — Dmitriy Bolotin
(74) *Attorney, Agent, or Firm* — Birch, Stewart, Kolasch & Birch, LLP

(57) ABSTRACT

Provided is a virtual image display device where a scenery and a video can be displayed to be superimposed on each other and a field of view is wide. The virtual image display device includes: a transparent display; and an optical system that is disposed on a visible side with respect to the transparent display, in which the optical system includes a half mirror and a reflective polarizer, and at least one of the half mirror or the reflective polarizer has an action of a concave mirror.

16 Claims, 11 Drawing Sheets

(51) Int. Cl.
  *G02B 27/00*     (2006.01)
  *G02B 27/28*     (2006.01)
  *G06F 3/01*      (2006.01)

(52) U.S. Cl.
  CPC ........... *G02B 27/283* (2013.01); *G06F 3/013* (2013.01); *G02B 2027/0123* (2013.01)

(58) Field of Classification Search
  CPC .......... G02B 27/286; G02B 5/18; G02B 5/30; G02B 5/3016; G02B 5/3083; G02F 1/13; G02F 1/1335; G06F 3/013
  See application file for complete search history.

(56) References Cited

U.S. PATENT DOCUMENTS

| | | |
|---|---|---|
| 2010/0177113 A1 | 7/2010 | Gay et al. |
| 2016/0231568 A1 | 8/2016 | Saarikko et al. |
| 2020/0049992 A1* | 2/2020 | Peng .................. G06F 3/012 |

OTHER PUBLICATIONS

International Search Report (Form PCT/ISA/210) for International Application No. PCT/JP2022/005273, dated May 10, 2022, with an English translation.

* cited by examiner

VIRTUAL IMAGE DISPLAY DEVICE

CROSS-REFERENCE TO RELATED APPLICATIONS

This application is a Continuation of PCT International Application No. PCT/JP2022/005273 filed on Feb. 10, 2022, which claims priority under 35 U.S.C. § 119(a) to Japanese Patent Application No. 2021-026308 filed on Feb. 22, 2021. The above applications are hereby expressly incorporated by reference, in their entirety, into the present application.

BACKGROUND OF THE INVENTION

1. Field of the Invention

The present invention relates to a virtual image display device.

2. Description of the Related Art

Recently, as described in US2016/0231568A1, augmented reality (AR) glasses that display a virtual image and various information or the like to be superimposed on a scene that is actually being seen have been put into practice. The AR glasses are also called, for example, smart glasses or a head-mounted display (HMD).

As described in US2016/0231568A1, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is guided using a light guide element where a diffraction element is disposed on a surface of a light guide plate. Specifically, light (projection light) projected from a display is diffracted (refracted) using the diffraction element to be incident into one end part of the light guide plate. As a result, the light is introduced into the light guide plate at an angle such that the light is totally reflected and propagates in the light guide plate. The light propagated in the light guide plate is also diffracted by an emission diffraction element in the other end part of the light guide plate and is emitted from the light guide plate to an observation position by the user.

For the AR glasses, it is required that a field of view (FOV) that is a region where an image is displayed is wide.

To that end, in the AR glasses including the light guide plate, it is considered to widen the FOV by increasing the refractive index of the light guide plate and increasing a difference in refractive index from air to increase a condition (angle) where light is totally reflected in the light guide plate.

SUMMARY OF THE INVENTION

However, in the AR glasses including the light guide plate, a refractive index of a high refractive index material that can be used for the light guide plate is limited to about 2.0, and the FOV cannot be sufficiently widened.

An object of the present invention is to solve the above-described problem of the related art and to provide a virtual image display device where a scenery and a video can be displayed to be superimposed on each other and a field of view is wide.

In order to achieve the object, the present invention has the following configurations.

[1] A virtual image display device comprising:
a transparent display; and
an optical system that is disposed on a visible side with respect to the transparent display,
in which the optical system includes a half mirror and a reflective polarizer, and
at least one of the half mirror or the reflective polarizer has an action of a concave mirror.

[2] The virtual image display device according to [1],
in which the reflective polarizer is a liquid crystal diffraction element that includes a cholesteric liquid crystal layer having, in a radial shape, a liquid crystal alignment pattern in which a direction of an optical axis derived from a liquid crystal compound is continuously rotating in one in-plane direction in any of surfaces.

[3] The virtual image display device according to [1] or [2],
in which at least a part of a ray emitted from the transparent display is in a first polarization state immediately before being incident into the optical system, and
at least a part of the ray that is incident from a back surface of the transparent display and transmits through the transparent display is in a second polarization state orthogonal to the first polarization state immediately before being incident into the optical system.

[4] The virtual image display device according to [3],
in which the first polarization state and the second polarization state are any of right circularly polarized light or left circularly polarized light.

[5] The virtual image display device according to any one of [1] to [4],
in which a polarization separating element having a function of separating incident light into polarized light components orthogonal to each other is provided between the transparent display and the optical system.

[6] The virtual image display device according to [5],
in which the polarization separating element includes any of an active retardation layer that is capable of switching a direction of a slow axis or a size of retardation, a patterned retardation layer that includes a plurality of two kinds of regions different in at least one of a direction of a slow axis or a size of retardation, an active polarizer that is capable of switching a direction of a transmission axis or an absorption axis, or a patterned polarizer that includes a plurality of two kinds of regions different in a direction of a transmission axis or an absorption axis.

[7] The virtual image display device according to any one of [1] to [6],
in which the reflective polarizer is a reflective linear polarizer, and
the optical system includes at least the half mirror, a $\lambda/4$ retardation layer, the reflective linear polarizer, and an absorptive linear polarizer in this order.

[8] The virtual image display device according to any one of [1] to [6],
in which the reflective polarizer is a reflective circular polarizer, and
the optical system includes at least the half mirror, the reflective circular polarizer, a $\lambda/4$ retardation layer, and an absorptive linear polarizer in this order.

[9] The virtual image display device according to any one of [1] to [8],
in which an infrared lighting device is provided on a back side of the transparent display, and
the infrared lighting device lights eyes of a user through the optical system.

[10] The virtual image display device according to any one of [1] to [9],
wherein an infrared sensor is provided on a back side of the transparent display, and
the infrared sensor images eyes of a user through the optical system.

According to the present invention, it is possible to provide a virtual image display device where a scenery and a video can be displayed to be superimposed on each other and a field of view is wide.

DESCRIPTION OF THE PREFERRED EMBODIMENTS

Hereinafter, the details of the present invention will be described. The following description regarding components has been made based on a representative embodiment of the present invention. However, the present invention is not limited to the embodiment. In the present specification, numerical ranges represented by "to" include numerical values before and after "to" as lower limit values and upper limit values. In addition, "orthogonal" or "parallel" regarding an angle represents a range of the exact angle ±10°.

In the present specification, "slow axis" represents a direction in which a refractive index in a plane is the maximum.

In addition, visible light refers to light having a wavelength which can be observed by human eyes among electromagnetic waves and refers to light in a wavelength range of 380 to 780 nm.

<Virtual Image Display Device>

A virtual image display device according to an embodiment of the present invention comprises:
a transparent display; and
an optical system that is disposed on a visible side with respect to the transparent display,
in which the optical system includes a half mirror and a reflective polarizer, and
at least one of the half mirror or the reflective polarizer has an action of a concave mirror.

Figure 1:
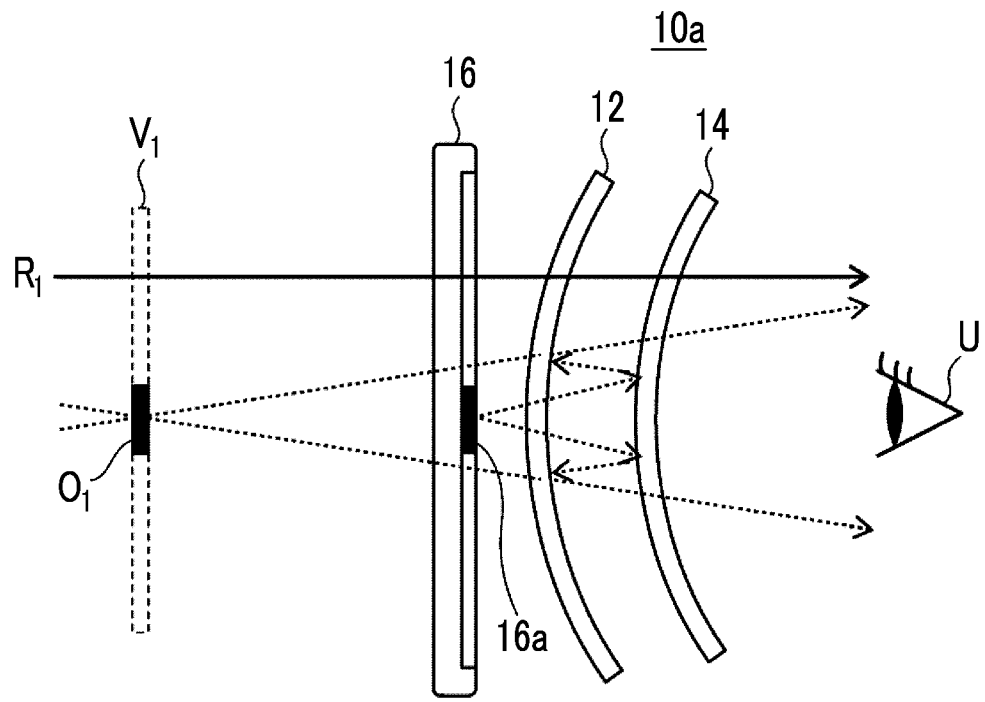
FIG. 1 is a diagram conceptually showing an example of a virtual image display device according to the present invention.

FIG. 1 is a diagram conceptually showing an example of a virtual image display device according to the embodiment of the present invention.

A virtual image display device 10a shown in FIG. 1 includes a transparent display 16, a half mirror 12, and a reflective polarizer 14 in this order. The half mirror 12 and the reflective polarizer 14 are the optical system according to the embodiment of the present invention. In the following description, a surface of the transparent display where the optical system is disposed will be referred to as a front surface, and a surface opposite to the front surface will be referred to as a back surface.

The transparent display 16 is a well-known transparent display. Examples of the transparent display include a display device where fine light-emitting emitters are arranged on a transparent substrate, for example, an organic electroluminescent display device, a light emitting diode (LED) display device, or a micro LED display device. Other examples of the transparent display include a liquid crystal display device that is configured to allow transmission of light. Further, as the transparent display, a transparent screen can also be used. In the following description, the organic electroluminescence display device will also be referred to as "OLED". OLED is an abbreviation for "Organic Light Emitting Diode".

The half mirror 12 and the reflective polarizer 14 are disposed on a visible side of the transparent display 16.

The half mirror 12 is a semi-transmissive and semi-reflective half mirror that reflects a part of incident light and allows transmission of the remaining light.

The reflective polarizer 14 allows transmission of light having one polarization state in incident light and reflects polarized light orthogonal to the polarized light. That is, the reflective polarizer 14 reflects a part of incident light and allows transmission of the remaining light.

Here, the polarized light components orthogonal to each other are polarized light components positioned on opposite sides of the Poincare sphere, for example, the north pole and the south pole of the Poincare sphere. Specifically, the polarized light components orthogonal to each other are right circularly polarized light and left circularly polarized light in terms of circularly polarized light and are linearly polarized light components orthogonal to each other in terms of linearly polarized light. The reflective polarizer in the reflective polarizer 14 may be a reflective linear polarizer or may be a reflective circular polarizer.

Here, in the present invention, at least one of the half mirror 12 or the reflective polarizer 14 has an action of a concave mirror. In the example shown in the drawing, light emitted from the transparent display 16 transmits through the half mirror 12 is reflected from the reflective polarizer 14, and is incident into the half mirror 12 again. In this case, with respect to the light, the half mirror 12 includes an incident surface having a concave surface shape and has an action of a concave mirror.

The configurations of the half mirror 12 and the reflective polarizer 14 will be described below.

The action of the virtual image display device 10a will be described using FIGS. 1 and 2.

The transparent display 16 emits light that forms an image. In this case, light is emitted from each of points (each of pixels) of the transparent display toward various directions. In FIG. 1, light emitted from one pixel 16a is indicated by a broken line arrow. In addition, for example, as shown in FIG. 2, a case where the light emitted from the transparent display 16 has a polarization state of right circularly polarized light during incidence into the half mirror 12.

The light emitted from the transparent display 16 is incident into the half mirror 12, and a part of the incident light transmits through the half mirror 12. The light transmitted through the half mirror 12 is incident into the reflective polarizer 14. A polarized light component to be reflected from the reflective polarizer 14 in the incident light is reflected from the reflective polarizer 14, and is incident into the half mirror 12 again. In the example shown in FIG. 2, the reflective polarizer 14 reflects right circularly polarized light. In this case, the reflective polarizer 14 has an action of a convex mirror, and thus the light is reflected to further spread. The light reflected from the reflective polarizer 14 is incident into the half mirror 12 without any change from the right circularly polarized light.

A part of the light incident into the half mirror 12 is reflected from the half mirror 12. In this case, the half mirror 12 has an action of a concave mirror with respect to the incidence light. Therefore, the light is reflected to be collected to form a virtual image on a back side of the half mirror 12 (side opposite to the visible side). In addition, due to the reflection from the half mirror 12, the circularly polarized light is converted into circularly polarized light having an opposite turning direction. In the example shown in FIG. 2, the light reflected from the half mirror 12 is converted into left circularly polarized light.

The light reflected from the half mirror 12 is incident into the reflective polarizer 14. The light incident into the reflective polarizer 14 is a polarized light component (left circularly polarized light) that transmits through the reflective polarizer 14, and thus transmits through the reflective polarizer 14 and is emitted to a user U.

In this case, due to the action of the concave mirror by the half mirror 12 and the action of the convex mirror by the reflective polarizer 14, the light is collected and emitted to the visible side with respect to that immediately before being emitted from the transparent display 16. As a result, the light reflected from the half mirror 12 and the reflective polarizer 14 is seen to be emitted from one point $O_1$ where a plurality of rays thereof extend toward the transparent display 16 and are converged. Therefore, the user U who sees the light recognizes that the light is emitted from the point $O_1$ on the depth side (opposite to the user U side) of the transparent display 16. As in the light emitted from each of pixels of the transparent display 16, the light is seen to be emitted from each of points on the depth side with respect to the transparent display 16. As a result, the video (image) displayed by the transparent display 16 is visually recognized to the user U as a virtual image $V_1$ on the depth side of the transparent display 16.

In addition, light $R_1$ from a scenery on the depth side of the transparent display 16 transmits through the transparent display 16, a part thereof transmits through the half mirror 12, and another part thereof transmits through the reflective polarizer 14 and reaches the user U. As a result, the scenery is also visually recognized by the user U.

As a result, the virtual image display device 10a can display the scenery and the virtual image (video) to be superimposed on each other.

Figure 2:
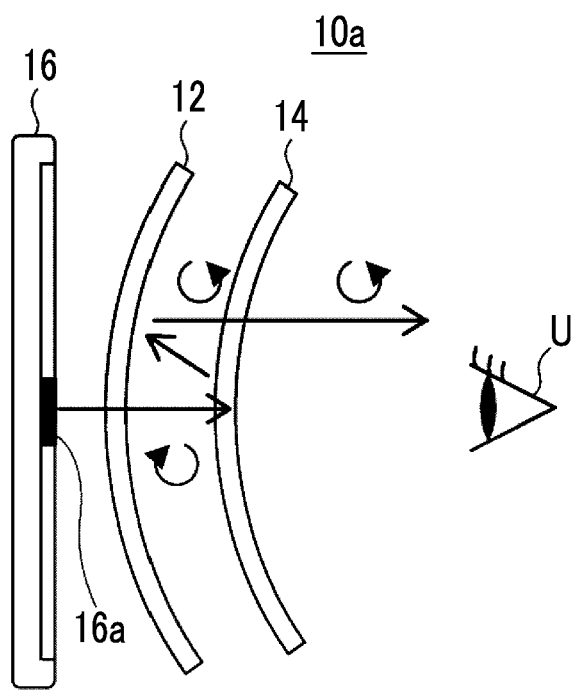
FIG. 2 is a conceptual diagram showing a polarization state of light in the virtual image display device shown in FIG. 1.

In the example shown in FIGS. 1 and 2, the virtual image display device 10a has the configuration in which the half mirror 12 and reflective polarizer 14 are disposed in this order from the transparent display 16 side. However, the present invention is not limited to this example. As in a virtual image display device 10b shown in FIG. 3, the reflective polarizer 14 and the half mirror 12 may be disposed in this order from the transparent display 16 side.

Figure 3:
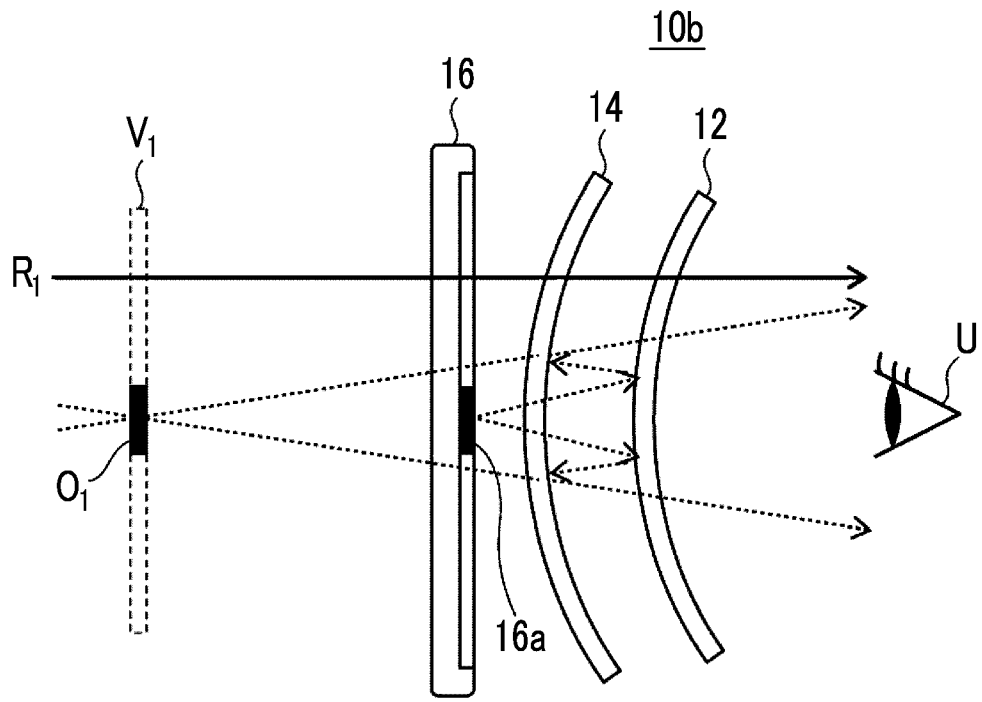
FIG. 3 is a diagram conceptually showing another example of the virtual image display device according to the present invention.

The virtual image display device 10b shown in FIG. 3 includes the transparent display 16, the reflective polarizer 14, and the half mirror 12 in this order. The half mirror 12 and the reflective polarizer 14 are the optical system according to the embodiment of the present invention.

In the example shown in FIG. 3, the light emitted from the transparent display 16 transmits through the reflective polarizer 14, is reflected from the half mirror 12, and is incident into the reflective polarizer 14 again. In this case, with respect to the light, the reflective polarizer 14 includes an incident surface side having a concave surface shape and has an action of a concave mirror.

In the virtual image display device 10b shown in FIG. 3, the light emitted from the transparent display 16 is incident into the reflective polarizer 14. In this case, light is emitted from each of points (each of pixels) of the transparent display toward various directions. In FIG. 3, light emitted from one pixel 16a is indicated by a broken line arrow. One polarized light component of the incident light transmits through the reflective polarizer 14. The light transmitted through the reflective polarizer 14 is incident into the half mirror 12, and a part thereof is reflected from the half mirror 12. In this case, the light reflected from the half mirror 12 is converted into polarized light having a polarization state orthogonal thereto. In addition, the half mirror 12 has an action of a convex mirror, and thus the light is reflected to further spread.

The light reflected from the half mirror 12 is incident into the reflective polarizer 14 again. Due to the reflection from the half mirror 12, the polarization state of the light is converted. Therefore, the light incident into the reflective polarizer 14 is reflected from the reflective polarizer 14. In this case, the reflective polarizer 14 has an action of a concave mirror, and thus the light is reflected to be collected.

The light reflected from the reflective polarizer 14 is incident into the half mirror 12. A part of the light incident into the half mirror 12 transmits through the half mirror 12 and is emitted to the user U.

In this case, due to the action of the convex mirror by the half mirror 12 and the action of the concave mirror by the reflective polarizer 14, the light is collected and emitted to the visible side with respect to that immediately before being emitted from the transparent display 16. As a result, the light reflected from the half mirror 12 and the reflective polarizer 14 is seen to be emitted from one point $O_1$ where a plurality of rays thereof extend toward the transparent display 16 and are converged. Therefore, the user U who sees the light recognizes that the light is emitted from the point $O_1$ on the depth side (opposite to the user U side) of the transparent display 16. As in the light emitted from each of pixels of the transparent display 16, the light is seen to be emitted from each of points on the depth side with respect to the transparent display 16. As a result, the video (image) displayed by the transparent display 16 is visually recognized to the user U as a virtual image $V_1$ on the depth side of the transparent display 16.

In addition, light $R_1$ from a scenery on the depth side of the transparent display 16 transmits through the transparent display 16, a part thereof transmits through the reflective polarizer 14, and another part thereof transmits through the half mirror 12 and reaches the user U. As a result, the scenery is also visually recognized by the user U.

As a result, the virtual image display device 10a can display the scenery and the virtual image (video) to be superimposed on each other.

Here, in the examples shown in FIGS. 1 to 3, both of the half mirror 12 and the reflective polarizer 14 have a shape of a concave surface on the user U side, and any one of the half mirror 12 or the reflective polarizer 14 has an action of a concave mirror with respect to the incidence light. However, the present invention is not limited to the examples. The half mirror 12 and/or the reflective polarizer 14 may be configured by a diffraction element or the like to be a flat plate that functions as a concave mirror with respect to the incidence light. In addition, among the half mirror 12 and the reflective polarizer 14, one component that does not have an action of a concave mirror with respect to the incidence light may have a flat shape, the component not having an action as a concave mirror or a convex mirror with respect to the incidence light.

Figure 4:
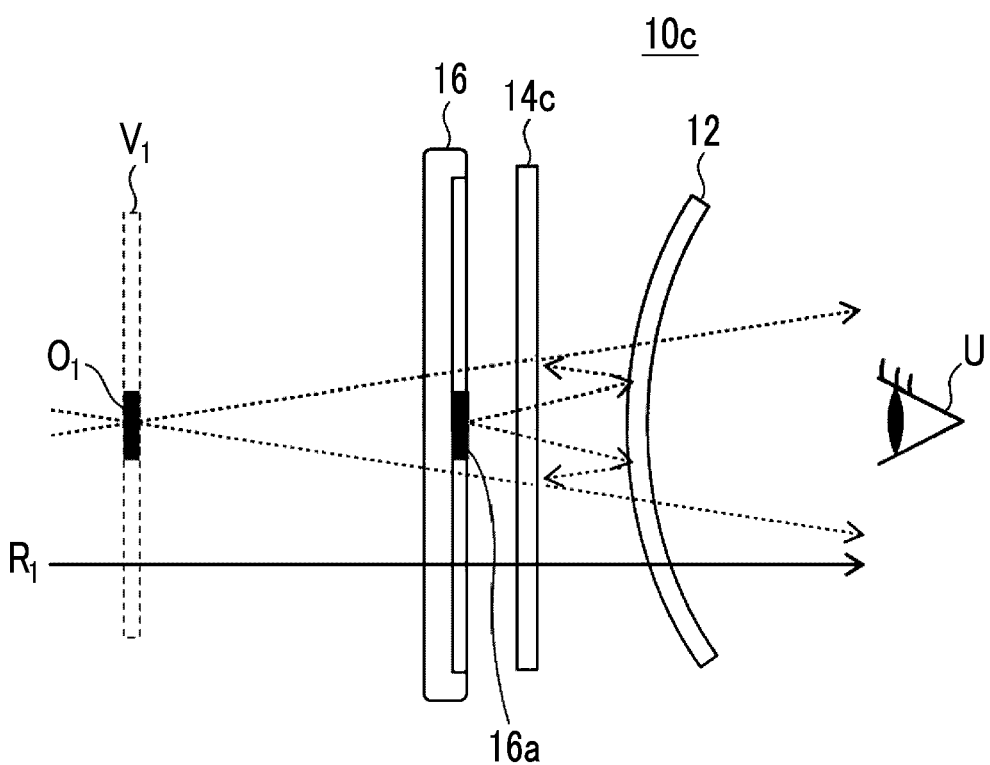
FIG. 4 is a diagram conceptually showing another example of the virtual image display device according to the present invention.

A virtual image display device 10c shown in FIG. 4 includes the transparent display 16, a reflective polarizer 14c, and the half mirror 12 in this order. The half mirror 12 and the reflective polarizer 14c are the optical system according to the embodiment of the present invention.

In the example shown in FIG. 4, the half mirror 12 has a shape of a concave surface on the user U side, and has an action of a convex mirror with respect to the incidence light from the half mirror 12. On the other hand, the reflective polarizer 14c is configured by a diffraction element or the like to be the flat reflective polarizer 14c that acts as a concave mirror with respect to the light incident into the reflective polarizer 14c after being reflected from the half mirror 12.

A specific configuration of the flat reflective polarizer 14c that acts as a concave mirror will be described below in detail.

The virtual image display device 10c shown in FIG. 4 acts as in the virtual image display device 10b shown in FIG. 3. That is, in the light emitted from the transparent display 16, a light component having a polarization state transmits through the reflective polarizer 14c, is reflected from the half mirror 12, and is incident into the reflective polarizer 14c again and reflected. In this case, the reflective polarizer 14c has an action of a concave mirror, and thus the light is reflected to be collected. The light reflected from the reflective polarizer 14c is incident into the half mirror 12, and a part of the incident light transmits through the half mirror 12 and emitted to the user U.

In this case, due to the action of the concave mirror by the reflective polarizer 14c, the light is collected and emitted to the visible side with respect to that immediately before being emitted from the transparent display 16. As a result, the video (image) displayed by the transparent display 16 is visually recognized to the user U as a virtual image $V_1$ on the depth side of the transparent display 16.

In addition, light $R_1$ from a scenery on the depth side of the transparent display 16 transmits through the transparent display 16, a part thereof transmits through the reflective polarizer 14c, and another part thereof transmits through the half mirror 12 and reaches the user U. As a result, the scenery is also visually recognized by the user U.

As a result, the virtual image display device 10c can display the scenery and the virtual image (video) to be superimposed on each other.

In the example shown in FIG. 4, the reflective polarizer is configured by a diffraction element or the like to be the flat reflective polarizer 14c that acts as a concave mirror. However, the half mirror 12 may be configured by a diffraction element or the like to be a flat half mirror that acts as a concave mirror.

Here, in the examples shown in FIGS. 1 to 4, as in the light that forms is emitted from the transparent display to form an image, the light of the scenery that is incident from the back surface of the transparent display and transmits through the transparent display may be emitted to the user U through a path where the light is reflected from the half mirror and the reflective polarizer. In this case, the scenery is visually recognized to be distorted by the user U due to the lens effect.

On the other hand, in the virtual image display device according to the embodiment of the present invention, it is preferable that at least a part of a ray emitted from the transparent display is in a first polarization state immediately before being incident into the optical system, and that at least a part of the ray that is incident from a back surface of the transparent display and transmits through the transparent display is in a second polarization state orthogonal to the first polarization state immediately before being incident into the optical system. As a result, the light of the scenery that is incident from the back surface of the transparent display and transmits through the transparent display is emitted to the user U through a path where the light transmits through the half mirror and the reflective polarizer. Therefore, the scenery is visually appropriately recognized by the user U without being distorted by the lens effect.

In this case, the first polarization state may be right circularly polarized light, and the second polarization state may be left circularly polarized light. Alternatively, the first polarization state may be left circularly polarized light, and the second polarization state may be right circularly polarized light.

In the configuration that exhibits the action, in the virtual image display device according to the embodiment of the present invention, a polarization separating element having a function of separating incident light into polarized light components orthogonal to each other may be further provided between the transparent display and the optical system.

Figure 5:
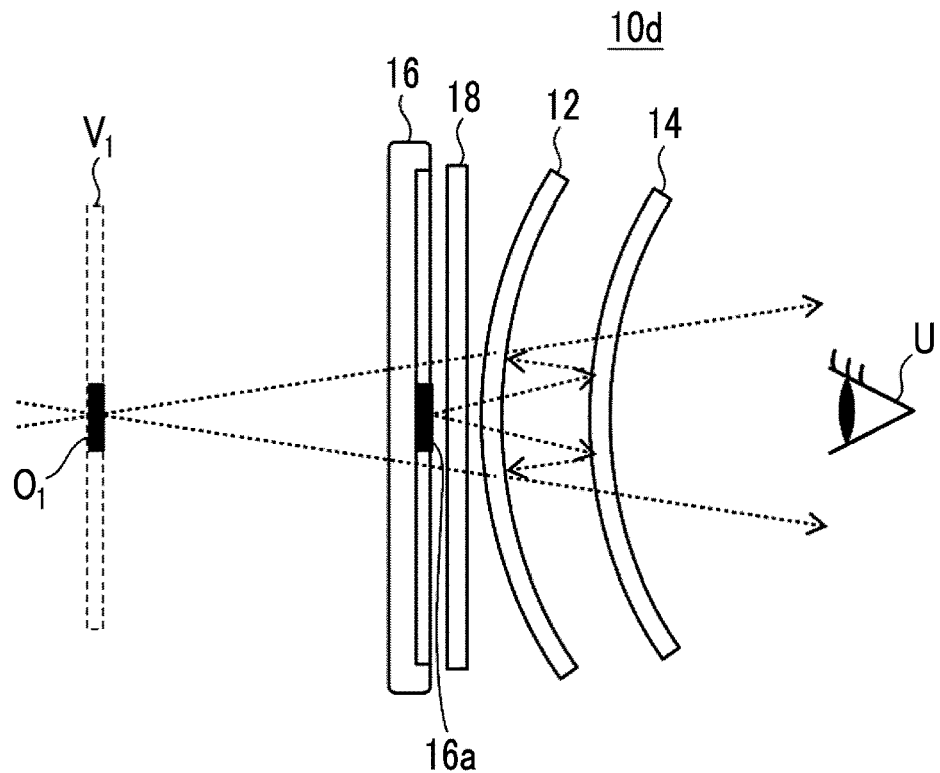
FIG. 5 is a diagram conceptually showing another example of the virtual image display device according to the present invention.

FIG. 5 is a diagram conceptually showing another example of the virtual image display device according to the embodiment of the present invention.

A virtual image display device 10*d* shown in FIG. 5 includes the transparent display 16, the polarization separating element 18, the half mirror 12, and the reflective polarizer 14 in this order.

The polarization separating element 18 is an element that separates at least a part of the incident light into polarized light components orthogonal to each other. Here, the polarized light components orthogonal to each other are polarized light components positioned on opposite sides of the Poincare sphere, for example, the north pole and the south pole of the Poincare sphere. Specifically, the polarized light components orthogonal to each other are right circularly polarized light and left circularly polarized light in terms of circularly polarized light and are linearly polarized light components orthogonal to each other in terms of linearly polarized light.

The half mirror 12, the reflective polarizer 14, and the polarization separating element 18 are disposed on the visible side of the transparent display 16. The half mirror 12, the reflective polarizer 14, and the transparent display 16 are as described above.

In the virtual image display device 10*d*, the optical paths of the light $R_1$ of the scenery and the light that forms the virtual image $V_1$ are divided by the polarization separation using the polarization separating element 18 such that the scenery and the virtual image $V_1$ having no distortion can be displayed to be superimposed on each other.

In the virtual image display device 10*d*, the transparent display 16 may include a pixel region where a video is displayed and a transparent region where a video is not displayed. In this case, the polarization separating element 18 performs polarization conversion or absorption depending on positions with respect to the incident light such that the light that is emitted from the pixel region to form the virtual image $V_1$ and the scenery light that transmits through the transparent region are separated to be in polarization states orthogonal to each other. Specifically, the light that is emitted from the pixel region to form the virtual image $V_1$ is in the first polarization state, and the scenery light that transmits through the transparent region is in the second polarization state.

In addition, in the virtual image display device 10*d*, the transparent display 16 alternately turns on and off the image display by time-division. In a case where the transparent display 16 performs the display by time-division, the polarization separating element 18 separates incident light into polarized light components orthogonal to each other by performing polarization conversion or absorption temporally alternately on the incident light. Specifically, in a case where the image display is turned on, the light that is emitted from the transparent display 16 to form the virtual image $V_1$ is in the first polarization state, and in a case where the image display is turned off, the scenery light that transmits through the transparent display 16 is in the second polarization state.

As a result, at the timing at which the image display is turned on, the polarization separating element 18 converts the light that is emitted from the transparent display 16 to form the virtual image $V_1$ into polarized light to be reflected from the reflective polarizer 14. Therefore, the light converted by the polarization separating element 18 is reflected to reciprocate between the reflective polarizer 14 and the half mirror 12 and is emitted to the visible side. On the other hand, at the timing at which the image display is turned off, the polarization separating element 18 converts the scenery light that transmits through the transparent display 16 into polarized light that transmits through the reflective polarizer 14. Therefore, the light that is converted by the polarization separating element 18 transmits through the half mirror 12 and the reflective polarizer 14 is emitted to the visible side without being reflect from the half mirror 12 and the reflective polarizer 14.

In a case where the image display is turned on, not only the light that is emitted from the transparent display 16 to form the virtual image $V_1$ the scenery light that transmits through the transparent display 16 are simultaneously present may be superimposed on each other. In order to separate the light components, it is preferable that a light shielding element that can switch between a light shielding state and a transmission state is disposed on the back side of the transparent display 16 such that, in a case where the image display is turned on, the scenery light is shielded to prevent transmission thereof. As the light shielding element, for example, a liquid crystal cell or an electrochromic element can be used.

In a case where the virtual image display device 10*d* performs the display by space-division, in the position where the scenery is displayed, that is, in the transparent region, the polarization separating element 18 converts the incident light into polarized light that transmits through the reflective polarizer 14. Therefore, the light that is converted by the polarization separating element 18 transmits through the half mirror 12 and the reflective polarizer 14 is emitted to the visible side without being reflect from the half mirror 12 and the reflective polarizer 14. On the other hand, in the position where the virtual image $V_1$ is displayed, that is, in the pixel region, the polarization separating element 18 converts the incident light into polarized light that is reflected from the reflective polarizer 14. Therefore, the light converted by the polarization separating element 18 is reflected to reciprocate between the reflective polarizer 14 and the half mirror 12 and is emitted to the visible side.

This way, in the virtual image display device 10*d*, by dividing the optical paths of the light $R_1$ of the scenery and the light that forms the virtual image $V_1$, the scenery and the virtual image $V_1$ having no distortion can be displayed to be superimposed on each other.

In the example shown in FIGS. 5, the virtual image display device 10*d* has the configuration in which the polarization separating element 18, the half mirror 12, and the reflective polarizer 14 are disposed in this order from the transparent display 16 side. However, the present invention is not limited to this example. The reflective polarizer 14, the half mirror 12, and the polarization separating element 18 may be disposed in this order from the transparent display 16 side. In this case, it is preferable that both of the light that forms the virtual image $V_1$ and the light of the scenery are in the polarization state where the light transmits through the reflective polarizer 14 immediately before being incident into the optical system. In this case, the light that forms the virtual image $V_1$ and the light of the scenery are separated into: the light that is reflected to reciprocate between the reflective polarizer 14 and the half mirror 12 and is emitted to the visible side in the first polarization state; and the light that transmits through the reflective polarizer 14 and the half mirror 12 and is emitted to the visible side in the second polarization state. Further, the polarization separating element 18 is driven by time-division such that transmission of only the light in the first polarization state is allowed while the image that forms the virtual image $V_1$ is displayed and transmission of only the light in the second polarization state is allowed while the image that forms the virtual image $V_1$ is not displayed. As a result, the scenery and the virtual image $V_1$ having no distortion can be displayed to be superimposed on each other.

The action of the virtual image display device shown in FIG. 5 will be described using FIGS. 6 and 7. In the example shown in the drawing, the reflective polarizer 14 will be described as a reflective circular polarizer that reflects right circularly polarized light and allows transmission of left circularly polarized light. In addition, in the description, it is assumed that, although not shown in the drawing, the transparent display 16 includes a linear polarizer on the front surface and the light that is emitted from the transparent display 16 and the light that transmits through the transparent display 16 are linearly polarized light.

In addition, in the example shown in the drawing, the polarization separating element 18 is a retardation layer. In a case where the transparent display 16 performs the display by time-division, the polarization separating element 18 is an active retardation layer that is capable of switching a direction of a slow axis or a size of retardation. In a case where the transparent display 16 performs the display by space-division, the polarization separating element 18 is a patterned retardation layer that includes a plurality of regions different in at least one of a direction of a slow axis or a size of retardation.

The polarization separating element 18 will be described below.

Figure 6:
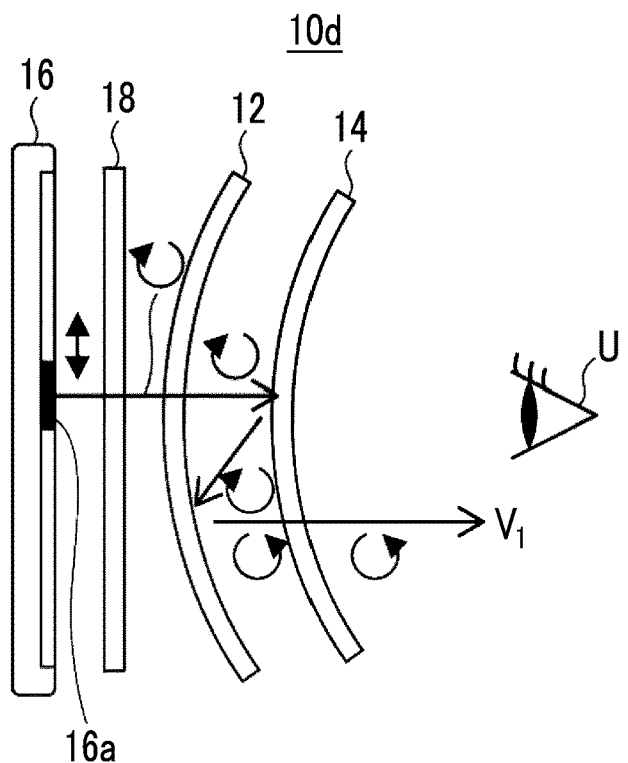
FIG. 6 is a diagram showing a state where the virtual image display device shown in FIG. 5 displays a virtual image.

In the example shown in FIG. 6, in the virtual image display device 10d, the timing at which the virtual image $V_1$ is displayed or the region where the virtual image $V_1$ is displayed is shown.

The action of the virtual image display device 10d in this state will be described.

The transparent display 16 emits light (virtual image) that forms an image. In this case, as described above, light is emitted from each of points (each of pixels) of the transparent display toward various directions. The light that is emitted from the transparent display 16 is emitted as, for example, linearly polarized light in the up-down direction in the drawing. The linearly polarized light that is emitted from the transparent display 16 transmits through the polarization separating element 18 to be converted into circularly polarized light. In addition, in the example shown in the drawing, the polarization separating element 18 is a retardation layer, and the polarization separating element 18 converts the linearly polarized light in the up-down direction into right circularly polarized light.

In a case where the right circularly polarized light is incident into the half mirror 12, a part of the light is reflected and converted into the left circularly polarized light. The reflected light is converted into linearly polarized light in a direction orthogonal to the linearly polarized light in the up-down direction incident into the polarization separating element 18 (in the direction perpendicular to the paper plane; in the following description, also referred to as linearly polarized light in the left-right direction; indicated by an arrow in the left-right direction in the drawing for the description) (not shown). The linearly polarized light is incident into the transparent display 16 and is absorbed by the linear polarizer in the transparent display 16.

On the other hand, the remaining light of the right circularly polarized light incident into the half mirror 12 transmits through the half mirror 12 and is incident into the reflective polarizer 14. In the example shown in the drawing, the reflective polarizer 14 reflects right circularly polarized light. Therefore, the right circularly polarized light incident into the reflective polarizer 14 is reflected to be incident into the half mirror 12.

Figure 9:
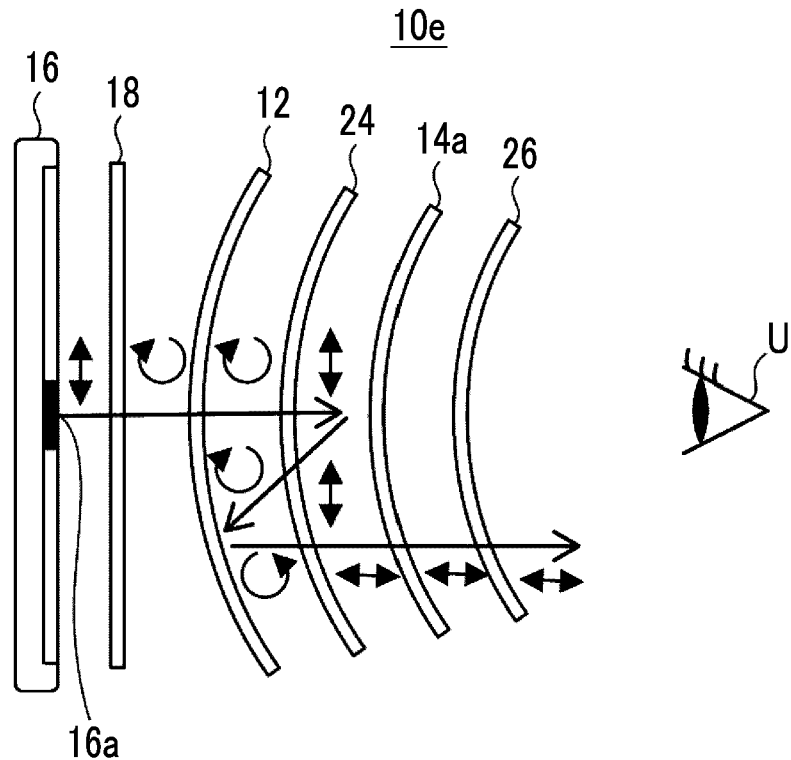
FIG. 9 is a diagram showing a state where the virtual image display device shown in FIG. 8 displays a virtual image.
Figure 12:
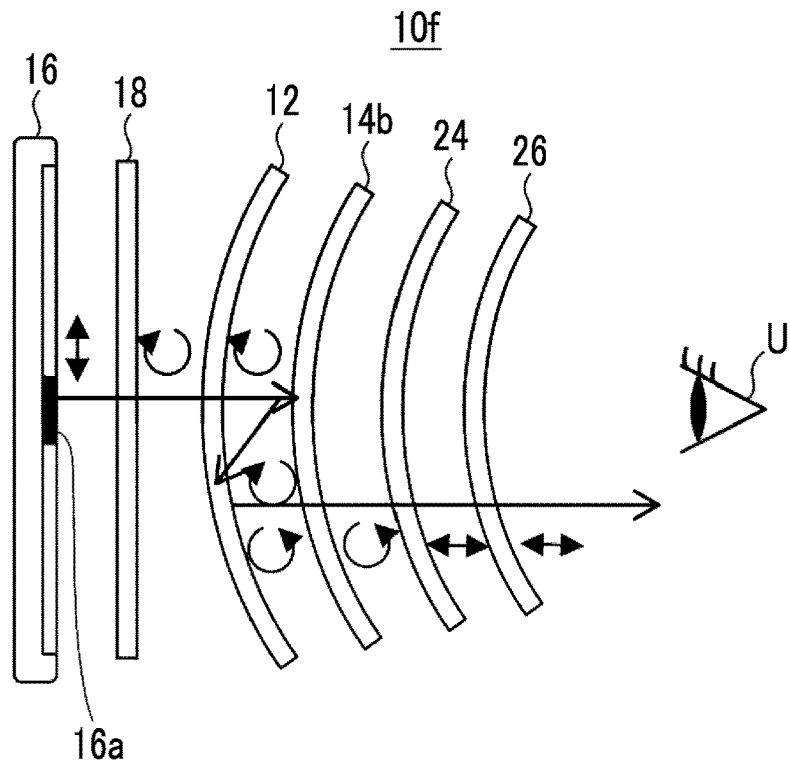
FIG. 12 is a diagram showing a state where the virtual image display device shown in FIG. 8 displays a virtual image.

A part of the light incident into the half mirror 12 is reflected. In this case, the right circularly polarized light is converted into left circularly polarized light by reflection. In addition, the half mirror 12 has an action of a concave mirror, and thus the light is reflected to be collected. FIG. 6 is simplified for the description, in which a direction of a ray does not indicate a direction of an actual ray. The same can also be applied to FIGS. 9 and 12 shown below.

On the other hand, the remaining light of the right circularly polarized light incident into the half mirror 12 transmits through the half mirror 12. The right circularly polarized light transmitted through the half mirror 12 is converted into linearly polarized light in the up-down direction by the polarization separating element 18. The linearly polarized light transmits through the linear polarizer in the transparent display 16 and transmits through the transparent display 16.

The left circularly polarized light reflected from the half mirror 12 is incident into the reflective polarizer 14. The reflective polarizer 14 reflects right circularly polarized light. Therefore, left circularly polarized light transmits through the reflective polarizer 14 and reaches the user U.

As a result, in the virtual image display device 10d, at the timing at which the transparent display 16 displays the virtual image $V_1$ or in the region where the transparent display 16 displays the virtual image $V_1$, the light that passes through the optical path for the virtual image $V_1$ is reflected to reciprocate between the reflective polarizer 14 and the half mirror 12 and is emitted to the user U side. As a result, the user U visually recognizes the image displayed by the transparent display 16 as the virtual image $V_1$ on the depth side of the transparent display.

Figure 7:
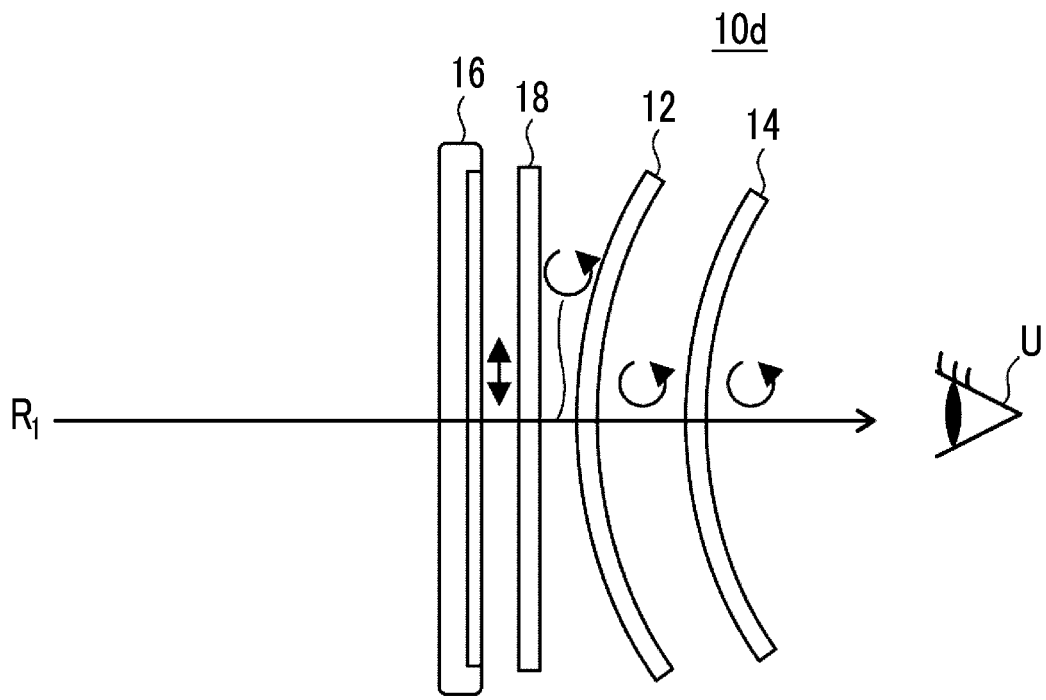
FIG. 7 is a diagram showing a state where the virtual image display device shown in FIG. 5 displays a scenery.

On the other hand, in the example shown in FIG. 7, in the virtual image display device 10d, the timing at which the scenery is displayed or the region where the scenery is displayed is shown.

The action of the virtual image display device 10d in this state will be described.

The light $R_1$ of the scenery transmits through the transparent display 16. In this case, as described above, the transparent display includes the linear polarizer. Therefore, the light transmitted through the transparent display 16 is converted into linearly polarized light in the up-down direction. The linearly polarized light transmits through the polarization separating element 18 as the retardation layer to be converted into circularly polarized light. In the example shown in the drawing, for example, the polarization separating element 18 converts the linearly polarized light in the up-down direction into left circularly polarized light. That is, in FIGS. 6 and 7, the polarization separating element 18 is the active retardation layer or the patterned retardation layer. In the state shown in FIG. 7, the direction of the slow axis in the polarization separating element 18 (retardation layer) is different from the state shown in FIG. 6. The linearly polarized light in the up-down direction transmitted through the polarization separating element 18 (retardation layer) is converted into left circularly polarized light opposite to the state of shown in FIG. 6.

In a case where the left circularly polarized light is incident into the half mirror 12, a part of the light is reflected and converted into the right circularly polarized light (not shown). The reflected light is incident into the polarization separating element 18 to be converted into linearly polarized light in the left-right direction (direction perpendicular to the paper plane). The linearly polarized light is incident into the transparent display 16 and is absorbed by the linear polarizer in the transparent display 16.

On the other hand, the remaining light of the left circularly polarized light incident into the half mirror 12 transmits through the half mirror 12 and is incident into the reflective polarizer 14. The incident light is circularly polarized light having a turning direction opposite to that of the circularly polarized light reflected from the reflective polarizer 14, and thus transmits through the reflective polarizer 14 and reaches the user U.

As described above, at the timing at which the virtual image display device 10d displays the scenery or in the region where the virtual image display device 10d displays the scenery, the light of the scenery transmits through only an optical path where the light transmits through all of the members of the virtual image display device 10d, is emitted to the user U side, and is prevented from transmitting an optical path where the light is reflected in the virtual image display device 10d. As a result, the scenery can be prevented from being visually recognized to be distorted.

This way, in the virtual image display device 10d, at the timing or in the region where the transparent display 16 allows transmission of (displays) the scenery, the polarization separating element 18 allows the light of the scenery to transmit through an optical path where the light transmits through all of the members of the virtual image display device 10d. At the timing or in the region where the transparent display 16 displays the virtual image $V_1$, the polarization separating element 18 allows light that forms an image to transmit through an optical path where the light forms the virtual image $V_1$, that is, an optical path where the light reciprocates once between the reflective polarizer 14 and the half mirror 12. As a result, the virtual image $V_1$ is displayed. The virtual image display device 10d displays the scenery and the virtual image $V_1$ by time-division or by space-division such that the scenery and the virtual image $V_1$ can be displayed to be superimposed on each other.

In the example shown in FIGS. 5 to 7, the polarization separating element 18 is described as the active retardation layer or the patterned retardation layer. However, the present invention is not limited to the example. The polarization separating element 18 is a linear polarizer and may be an active polarizer that is capable of switching a direction of a transmission axis or an absorption axis or a patterned polarizer that includes two kinds of regions different in a direction of a transmission axis or an absorption axis.

In a case where the polarization separating element 18 is the active polarizer or the patterned polarizer, a configuration where a typical retardation layer is disposed between the polarization separating element 18 and the optical system and the transparent display 16 does not include a linear polarizer may be adopted. With the above-described configuration, at the timing or in the region where the virtual image $V_1$ is displayed, the light of the image emitted from the transparent display 16 is converted into one linearly polarized light by the polarization separating element 18, is converted into one circularly polarized light by the retardation layer, and is incident into the optical system. On the other hand, at the timing or in the region where the scenery is transmitted (displayed), the light of the scenery transmits through the transparent display 16, converted into the other linearly polarized light by the polarization separating element 18, is converted into the other circularly polarized light by the retardation layer, and is incident into the optical system. As a result, the optical path where the light transmits through the optical system is the same as that of FIGS. 6 and 7. Accordingly, even in a case where the active polarizer or the patterned polarizer is used as the polarization separating element 18, the virtual image display device displays the scenery and the virtual image $V_1$ by time-division or by space-division such that the scenery and the virtual image $V_1$ can be displayed to be superimposed on each other.

In addition, in the examples shown in FIGS. 5 to 7, the polarization separating element 18 is disposed between the transparent display 16 and the optical system, but the present invention is not limited thereto. The polarization separating element 18 may be disposed between the half mirror 12 and the reflective polarizer 14 and may be disposed on the visible side with respect to the optical system.

In addition, as the reflective polarizer 14, a reflective linear polarizer that allows transmission of linearly polarized light in one direction and reflects linearly polarized light in a direction orthogonal to the linearly polarized light may be used, or a reflective circular polarizer that allows transmission of right circularly polarized light and left circularly polarized light and reflects circularly polarized light having a turning direction opposite to that of the transmitted circularly polarized light may be used.

In a case where the reflective polarizer 14 is the reflective linear polarizer, it is preferable that the optical system includes at least a half mirror, a λ/4 retardation layer, a reflective linear polarizer, and an absorptive linear polarizer in this order.

Figure 8:
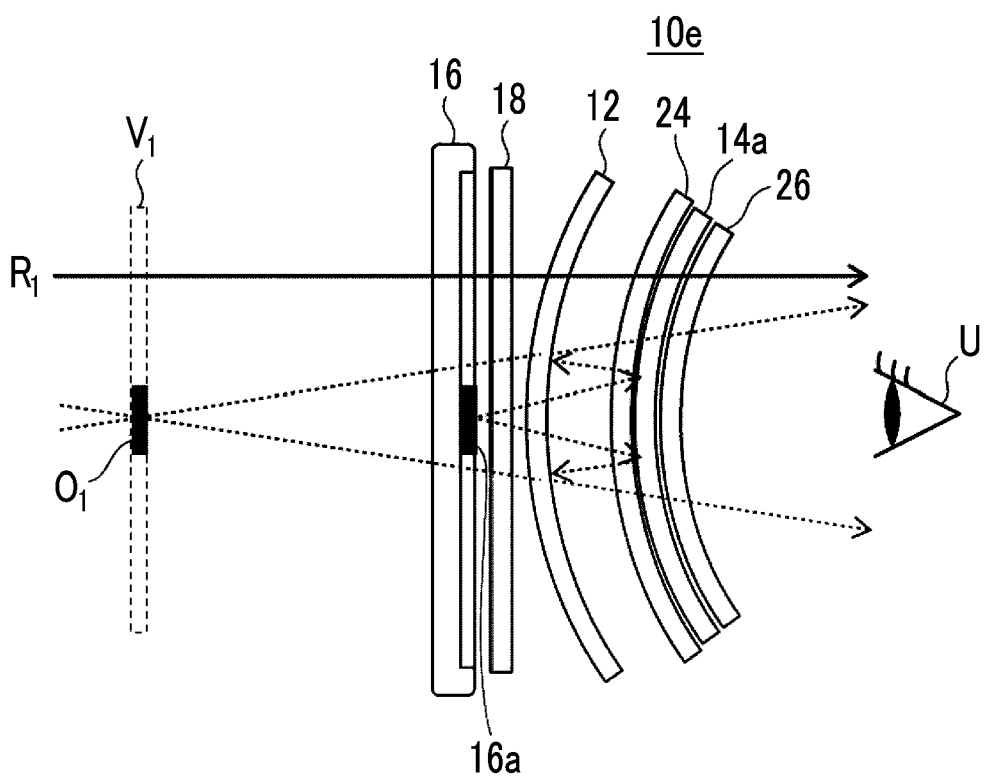
FIG. 8 is a diagram conceptually showing another example of the virtual image display device according to the present invention.

FIG. 8 is a diagram conceptually showing another example of the virtual image display device according to the embodiment of the present invention.

A virtual image display device 10e shown in FIG. 8 includes the transparent display 16, the polarization separating element 18, the half mirror 12, a λ/4 retardation layer 24, a reflective linear polarizer 14a, and an absorptive linear polarizer 26 in this order. The half mirror 12, the λ/4 retardation layer 24, the reflective linear polarizer 14a, and the absorptive linear polarizer 26 are the optical system according to the embodiment of the present invention.

The λ/4 retardation layer 24 is a well-known retardation layer having a retardation of λ/4. The λ/4 retardation layer 24 converts incident linearly polarized light into circularly polarized light or converts incident circularly polarized light into linearly polarized light.

The absorptive linear polarizer 26 is a well-known absorptive linearly polarizing plate.

The action of the virtual image display device 10e shown in FIG. 8 will be described using FIGS. 9 and 10.

In the example shown in FIG. 9, in the virtual image display device 10e, the timing at which the virtual image $V_1$ is displayed or the region where the virtual image $V_1$ is displayed is shown.

The action of the virtual image display device 10e in this state will be described. Although not shown in the drawing, a case where the transparent display 16 is the linear polarizer and the polarization separating element 18 is the patterned retardation layer or the active retardation layer will be described.

The transparent display 16 emits light (virtual image) that forms an image. In this case, as described above, light is emitted from each of points (each of pixels) of the transparent display toward various directions. The light that is emitted from the transparent display 16 is emitted as, for example, linearly polarized light in the up-down direction in the drawing. The linearly polarized light that is emitted from the transparent display 16 transmits through the polarization separating element 18 to be converted into circularly polarized light. In addition, in the example shown in the drawing, the polarization separating element 18 is a retardation layer, and the polarization separating element 18 converts the linearly polarized light in the up-down direction into right circularly polarized light.

In a case where the right circularly polarized light is incident into the half mirror 12, a part of the light is reflected and converted into the left circularly polarized light. The reflected light is incident into the polarization separating element 18 to be converted into linearly polarized light in the left-right direction (direction perpendicular to the paper plane) (not shown). The linearly polarized light is incident into the transparent display 16 and is absorbed by the linear polarizer in the transparent display 16.

On the other hand, the remaining light of the right circularly polarized light incident into the half mirror 12 transmits through the half mirror 12 and transmits through the λ/4 retardation layer 24. In this case, the light is converted into linearly polarized light by the λ/4 retardation layer 24. In the example shown in the drawing, for example, the λ/4 retardation layer 24 converts the right circularly polarized light into linearly polarized light in the up-down direction.

The linearly polarized light transmitted through the λ/4 retardation layer 24 is incident into the reflective linear polarizer 14a. In the example shown in the drawing, the reflective linear polarizer 14a reflects the linearly polarized light in the up-down direction. Therefore, the linearly polarized light incident into the reflective linear polarizer 14a is reflected to be incident into the λ/4 retardation layer 24. The linearly polarized light in the up-down direction incident into the λ/4 retardation layer 24 is converted into right circularly polarized light.

This right circularly polarized light is incident into the half mirror 12, and a part of the incident light is reflected. In this case, the right circularly polarized light is converted into left circularly polarized light by reflection. In addition, the half mirror 12 has an action of a concave mirror, and thus the light is reflected to be collected.

On the other hand, the remaining light of the right circularly polarized light incident into the half mirror 12 transmits through the half mirror 12. The right circularly polarized light transmitted through the half mirror 12 is converted into linearly polarized light in the up-down direction by the polarization separating element 18. The linearly polarized light transmits through the linear polarizer in the transparent display 16 and transmits through the transparent display 16.

The left circularly polarized light reflected from the half mirror 12 is incident into the λ/4 retardation layer 24 to be converted into linearly polarized light in the left-right direction.

This linearly polarized light is a linearly polarized light in a direction orthogonal to that of the linearly polarized light reflected from the reflective linear polarizer 14a, and thus transmits through the reflective linear polarizer 14a. The linearly polarized light transmitted through the reflective linear polarizer 14a is incident into the absorptive linear polarizer 26. The absorptive linear polarizer 26 allows transmission of linearly polarized light in the same direction as that of the linearly polarized light transmitted through the reflective linear polarizer 14a. Accordingly, in the example shown in the drawing, the absorptive linear polarizer 26 allows transmission of the linearly polarized light in the left-right direction in the drawing. Therefore, the linearly polarized light in the left-right direction transmits through the absorptive linear polarizer 26 and reaches the user U.

As a result, in the virtual image display device 10e, at the timing at which the transparent display 16 displays the virtual image $V_1$ or in the region where the transparent display 16 displays the virtual image $V_1$, the light that forms the virtual image $V_1$ transmits through the optical path where the light reciprocates once between the reflective linear polarizer 14a and the half mirror 12, and is emitted to the user U side. As a result, the user U visually recognizes the image displayed by the transparent display 16 as the virtual image $V_1$ on the depth side of the transparent display.

Figure 10:
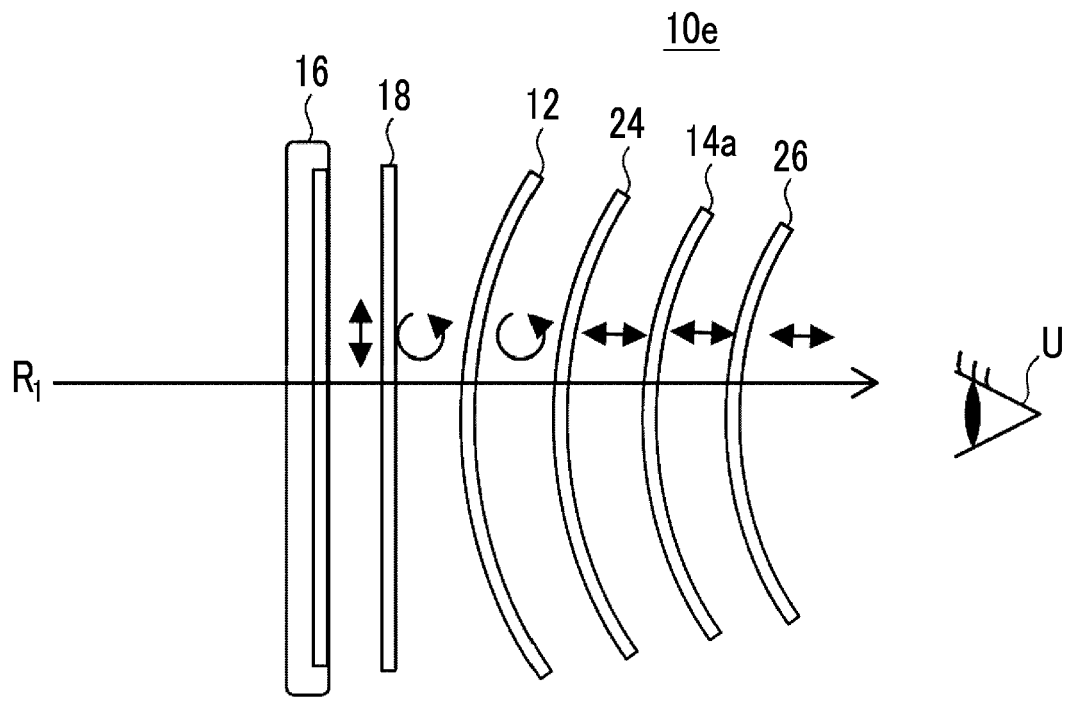
FIG. 10 is a diagram showing a state where the virtual image display device shown in FIG. 8 displays a scenery.

On the other hand, in the example shown in FIG. 10, in the virtual image display device 10e, the timing at which the scenery is displayed or the region where the scenery is displayed is shown.

The action of the virtual image display device 10e in this state will be described.

The light $R_1$ of the scenery transmits through the transparent display 16. In this case, as described above, the transparent display includes the linear polarizer. Therefore, the light transmitted through the transparent display 16 is converted into linearly polarized light in the up-down direction. The linearly polarized light transmits through the polarization separating element 18 as the retardation layer to be converted into circularly polarized light. In the example shown in the drawing, for example, the polarization separating element 18 converts the linearly polarized light in the up-down direction into left circularly polarized light. That is, in FIGS. 9 and 10, the polarization separating element 18 is the active retardation layer or the patterned retardation layer. In the state shown in FIG. 10, the direction of the slow axis in the polarization separating element 18 is different from the state shown in FIG. 9. The linearly polarized light in the up-down direction transmitted through the polarization separating element 18 is converted into left circularly polarized light opposite to the state of shown in FIG. 9.

In a case where the left circularly polarized light is incident into the half mirror 12, a part of the light is reflected and converted into the right circularly polarized light (not shown). The reflected light is incident into the polarization separating element 18 to be converted into linearly polarized light in the left-right direction (direction perpendicular to the paper plane). The linearly polarized light is incident into the transparent display 16 and is absorbed by the linear polarizer in the transparent display 16.

On the other hand, the remaining light of the left circularly polarized light incident into the half mirror 12 transmits through the half mirror 12 and transmits through the λ/4 retardation layer 24. In this case, the light is converted into linearly polarized light by the λ/4 retardation layer 24. In the example shown in the drawing, for example, the λ/4 retardation layer 24 converts the right circularly polarized light into linearly polarized light in the up-down direction. Therefore, the left circularly polarized light is converted into linearly polarized light in the left-right direction.

The linearly polarized light in the left-right direction converted by the λ/4 retardation layer 24 is incident into the reflective linear polarizer 14a. This linearly polarized light is a linearly polarized light in a direction orthogonal to that of the linearly polarized light reflected from the reflective linear polarizer 14a, and thus transmits through the reflective linear polarizer 14a. The linearly polarized light transmitted through the reflective linear polarizer 14a transmits through the absorptive linear polarizer 26 and reaches the user U.

As described above, at the timing at which the virtual image display device 10e displays the scenery or in the region where the virtual image display device 10e displays the scenery, the light of the scenery transmits through an optical path where the light transmits all of the members of the virtual image display device 10e, and is emitted to the user U side. As a result, the scenery can be prevented from being visually recognized to be distorted.

This way, in the virtual image display device 10e, at the timing or in the region where the transparent display 16 allows transmission of (displays) the scenery, the polarization separating element 18 allows the light of the scenery to transmit through an optical path where the light transmits through all of the members of the virtual image display device 10e. As a result, the scenery can be visually recognized. At the timing or in the region where the transparent display 16 displays the virtual image $V_1$, the polarization separating element 18 allows the light that forms the virtual image $V_1$ to transmit through an optical path where the light reciprocates once between the reflective linear polarizer 14a and the half mirror 12. As a result, the virtual image $V_1$ is displayed. The virtual image display device 10e displays the scenery and the virtual image $V_1$ by time-division or by space-division such that the scenery and the virtual image $V_1$ can be displayed to be superimposed on each other.

In addition, as a preferable aspect, the virtual image display device 10e includes the absorptive linear polarizer 26 that is provided on the visible side with respect to the reflective linear polarizer 14a. By including the absorptive linear polarizer 26, stray light such as the linearly polarized light component in the up-down direction that is not completely reflected from the reflective linear polarizer 14a can be absorbed by the absorptive linear polarizer 26, and visual recognition of an unnecessary image caused by the stray light can be more reliably suppressed. In addition, external light is reflected from the surface of the virtual image display device 10e, and so-called glittering can be prevented.

In addition, in a preferable aspect, in the virtual image display device 10e, a transmission axis of the reflective linear polarizer 14a and a transmission axis of the absorptive linear polarizer 26 are parallel to each other. Further, at the timing at which the virtual image $V_1$ is displayed or in the region where the virtual image $V_1$ is displayed, it is preferable that a slow axis of the retardation layer as the polarization separating element 18 and a slow axis of the λ/4 retardation layer 24 are orthogonal to each other.

In addition, it is preferable that the retardation of the retardation layer as the polarization separating element 18 and the retardation of the λ/4 retardation layer 24 match with each other. In addition, it is preferable that wavelength dispersibility of the polarization separating element 18 and wavelength dispersibility of the λ/4 retardation layer 24 match with each other, and it is more preferable that both of the wavelength dispersibility of the polarization separating element 18 and the wavelength dispersibility of the λ/4 retardation layer 24 are reverse dispersibility.

With the above-described configuration, stray light such as the linearly polarized light component that is not reflected from the reflective linear polarizer 14a can be further reduced, which is preferable.

In a case where the reflective polarizer 14 is the reflective circular polarizer, it is preferable that the optical system includes at least a half mirror, a reflective circular polarizer, a λ/4 retardation layer, and an absorptive linear polarizer in this order.

Figure 11:
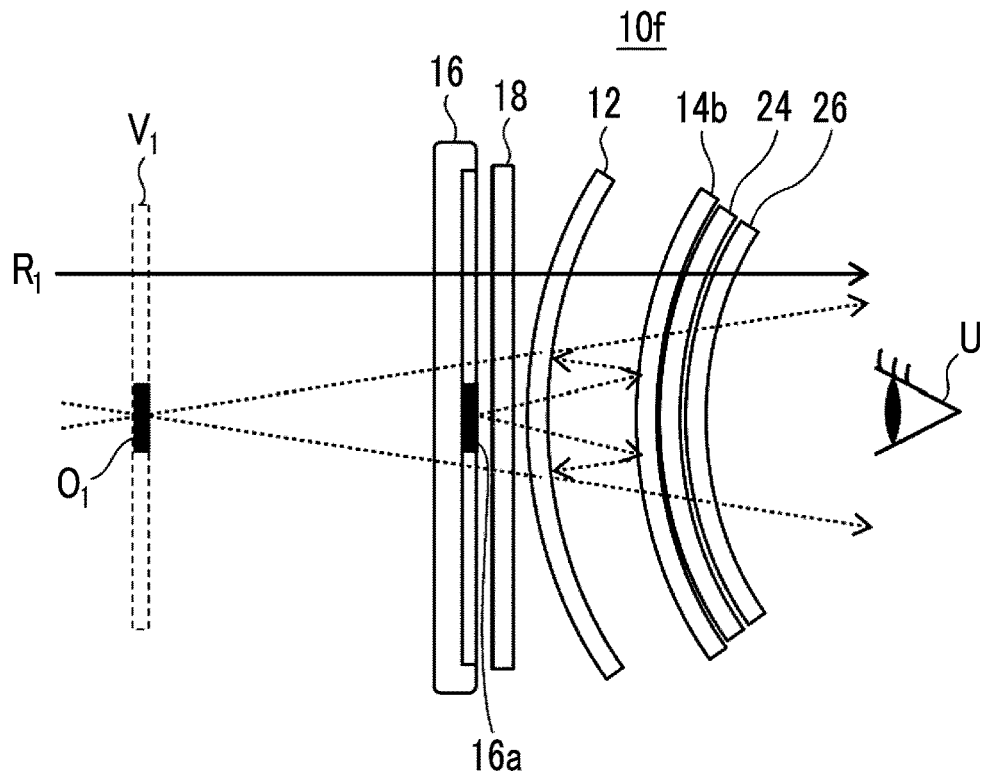
FIG. 11 is a diagram conceptually showing another example of the virtual image display device according to the present invention.

FIG. 11 is a diagram conceptually showing another example of the virtual image display device according to the embodiment of the present invention.

A virtual image display device 10f shown in FIG. 11 includes the transparent display 16, the polarization separating element 18, the half mirror 12, a reflective circular polarizer 14b, the λ/4 retardation layer 24, and the absorptive linear polarizer 26 in this order. The half mirror 12, the reflective circular polarizer 14b, the λ/4 retardation layer 24, and the absorptive linear polarizer 26 are the optical system according to the embodiment of the present invention.

The action of the virtual image display device 10f shown in FIG. 11 will be described using FIGS. 12 and 13.

In the example shown in FIG. 12, in the virtual image display device 10f, the timing at which the virtual image $V_1$ is displayed or the region where the virtual image $V_1$ is displayed is shown.

The action of the virtual image display device 10f in this state will be described. Although not shown in the drawing, a case where the transparent display 16 is the linear polarizer and the polarization separating element 18 is the patterned retardation layer or the active retardation layer will be described.

The transparent display 16 emits light (virtual image) that forms an image. In this case, as described above, light is emitted from each of points (each of pixels) of the transparent display toward various directions. The light that is emitted from the transparent display 16 is emitted as, for example, linearly polarized light in the up-down direction in the drawing. The linearly polarized light that is emitted from the transparent display 16 transmits through the polarization separating element 18 to be converted into circularly polarized light. In addition, in the example shown in the drawing, the polarization separating element 18 is a retardation layer, and the polarization separating element 18 converts the linearly polarized light in the up-down direction into right circularly polarized light.

In a case where the right circularly polarized light is incident into the half mirror 12, a part of the light is reflected and converted into the left circularly polarized light. The reflected light is incident into the polarization separating element 18 to be converted into linearly polarized light in the left-right direction (direction perpendicular to the paper plane) (not shown). The linearly polarized light is incident into the transparent display 16 and is absorbed by the linear polarizer in the transparent display 16.

On the other hand, the remaining light of the right circularly polarized light incident into the half mirror 12 transmits through the half mirror 12 and is incident into the reflective circular polarizer 14b. In the example shown in the drawing, the reflective circular polarizer 14b reflects right circularly polarized light. Therefore, the right circularly polarized light incident into the reflective circular polarizer 14b is reflected to be incident into the half mirror 12.

A part of the light incident into the half mirror 12 is reflected. In this case, the right circularly polarized light is converted into left circularly polarized light by reflection. In addition, the half mirror 12 has an action of a concave mirror, and thus the light is reflected to be collected.

On the other hand, the remaining light of the right circularly polarized light incident into the half mirror 12 transmits through the half mirror 12. The right circularly polarized light transmitted through the half mirror 12 is converted into linearly polarized light in the up-down direction by the polarization separating element 18. The linearly polarized light transmits through the linear polarizer in the transparent display 16 and transmits through the transparent display 16.

The left circularly polarized light reflected from the half mirror 12 is incident into the reflective circular polarizer 14b. The reflective circular polarizer 14b reflects right circularly polarized light, and thus allows transmission of left circularly polarized light.

The left circularly polarized light transmitted through the reflective circular polarizer 14b is incident into the λ/4 retardation layer 24. The incident left circularly polarized light is converted into linearly polarized light by the λ/4 retardation layer 24. In the example shown in the drawing, for example, the λ/4 retardation layer 24 converts the left circularly polarized light into linearly polarized light in the left-right direction.

The linearly polarized light transmitted through the λ/4 retardation layer 24 is incident into the absorptive linear polarizer 26. The absorptive linear polarizer 26 allows transmission of linearly polarized light having the same direction as that of the linearly polarized light that is converted from the linearly polarized light transmitted through the reflective circular polarizer 14b by the λ/4 retardation layer 24. Accordingly, in the example shown in the drawing, the absorptive linear polarizer 26 allows transmission of the linearly polarized light in the left-right direction in the drawing. Therefore, the linearly polarized light in the left-right direction transmits through the absorptive linear polarizer 26 and reaches the user U.

As a result, in the virtual image display device 10f, at the timing at which the transparent display 16 displays the virtual image V$_1$ or in the region where the transparent display 16 displays the virtual image V$_1$, the light that forms the virtual image V$_1$ transmits through the optical path where the light reciprocates once between the reflective circular polarizer 14b and the half mirror 12, and is emitted to the user U side. As a result, the user U visually recognizes the image displayed by the transparent display 16 as the virtual image V$_1$ on the depth side of the transparent display.

Figure 13:
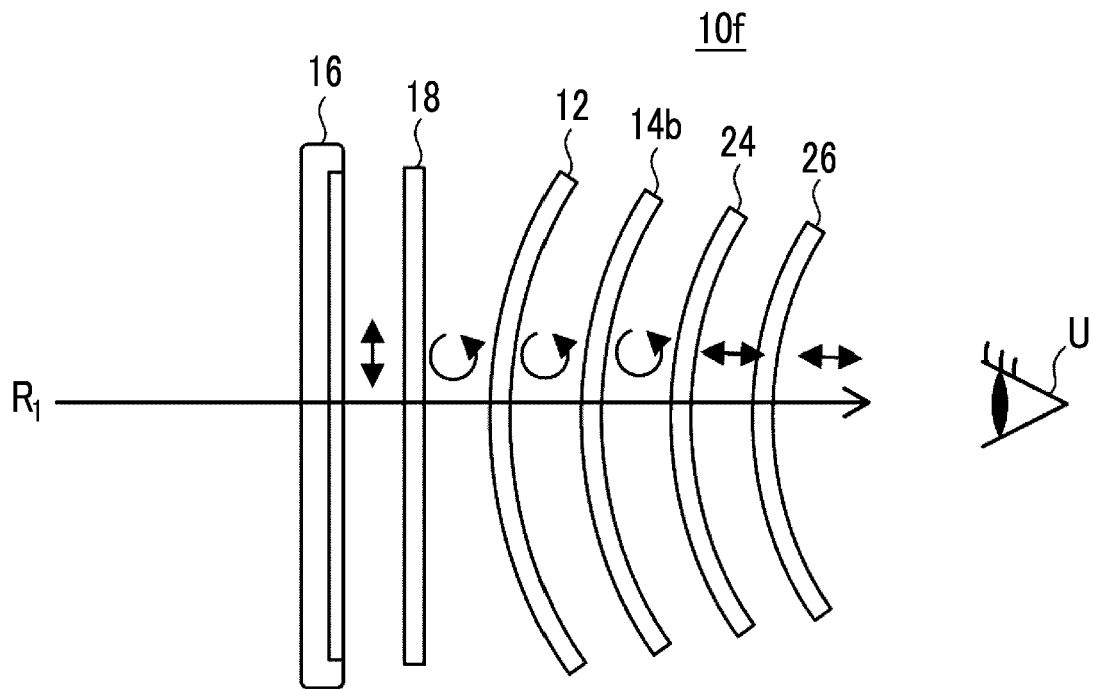
FIG. 13 is a diagram showing a state where the virtual image display device shown in FIG. 8 displays a scenery.

On the other hand, in the example shown in FIG. 13, in the virtual image display device 10f, the timing at which the scenery is displayed or the region where the scenery is displayed is shown.

The action of the virtual image display device 10f in this state will be described.

The light R$_1$ of the scenery transmits through the transparent display 16. In this case, as described above, the transparent display includes the linear polarizer. Therefore, the light transmitted through the transparent display 16 is converted into linearly polarized light in the up-down direction. The linearly polarized light transmits through the polarization separating element 18 as the retardation layer to be converted into circularly polarized light. In the example shown in the drawing, for example, the polarization separating element 18 converts the linearly polarized light in the up-down direction into left circularly polarized light. That is, in FIGS. 12 and 13, the polarization separating element 18 is the active retardation layer or the patterned retardation layer. In the state shown in FIG. 13, the direction of the slow axis in the polarization separating element 18 is different from the state shown in FIG. 12. The linearly polarized light in the up-down direction transmitted through the polarization separating element 18 is converted into left circularly polarized light opposite to the state of shown in FIG. 12.

In a case where the left circularly polarized light is incident into the half mirror 12, a part of the light is reflected and converted into the right circularly polarized light (not shown). The reflected light is incident into the polarization separating element 18 to be converted into linearly polarized light in the left-right direction (direction perpendicular to the paper plane). The linearly polarized light is incident into the transparent display 16 and is absorbed by the linear polarizer in the transparent display 16.

On the other hand, the remaining light of the left circularly polarized light incident into the half mirror 12 transmits through the half mirror 12 and is incident into the reflective circular polarizer 14b. The incident light is circularly polarized light orthogonal to the circularly polarized light reflected from the reflective circular polarizer 14b, and thus transmits through the reflective circular polarizer 14b. The left circularly polarized light transmitted through the reflective circular polarizer 14b is incident into the λ/4 retardation layer 24. The left circularly polarized light incident into the λ/4 retardation layer 24 is converted into linearly polarized light by the λ/4 retardation layer 24. As described above, in the example shown in the drawing, the λ/4 retardation layer 24 converts the left circularly polarized light into linearly polarized light in the left-right direction.

The linearly polarized light in the left-right direction converted by the λ/4 retardation layer 24 is incident into the absorptive linear polarizer 26. As described above, the absorptive linear polarizer 26 allows transmission of the linearly polarized light in the left-right direction in the drawing. Therefore, the linearly polarized light in the left-right direction transmits through the absorptive linear polarizer 26 and reaches the user U.

As described above, at the timing at which the virtual image display device 10f displays the scenery or in the region where the virtual image display device 10f displays the scenery, the light of the scenery transmits through an optical path where the light transmits through all of the members of the virtual image display device 10f, and is emitted to the user U side. As a result, the scenery can be prevented from being visually recognized to be distorted.

This way, in the virtual image display device 10f, at the timing or in the region where the transparent display 16 allows transmission of (displays) the scenery, the polarization separating element 18 allows the light of the scenery to transmit through an optical path where the light transmits through all of the members of the virtual image display device 10f. As a result, the scenery can be visually recognized. At the timing or in the region where the transparent display 16 displays the virtual image V$_1$, the polarization separating element 18 allows the light that forms the virtual image V$_1$ to transmit through an optical path where the light reciprocates once between the reflective circular polarizer 14b and the half mirror 12. As a result, the virtual image V$_1$ is displayed. The virtual image display device 10f displays the scenery and the virtual image V$_1$ by time-division or by space-division such that the scenery and the virtual image V$_1$ can be displayed to be superimposed on each other.

In addition, as a preferable aspect, the virtual image display device 10f includes the λ/4 retardation layer 24 and the absorptive linear polarizer 26 on the visible side with respect to the reflective circular polarizer 14b. The λ/4 retardation layer 24 and the absorptive linear polarizer 26 act as the absorptive circular polarizer. By including the absorptive circular polarizer, stray light such as the right circularly polarized light component that is not completely reflected from the reflective circular polarizer 14b can be absorbed by the absorptive circular polarizer, and visual recognition of an unnecessary image caused by the stray light can be more reliably suppressed. In addition, external light is reflected from the surface of the virtual image display device 10f, and so-called glittering can be prevented.

In addition, in the virtual image display device according to the embodiment of the present invention, it is preferable that various retardation layers (including the retardation layer as the polarization separating element) have reverse dispersibility. In a case where the retardation layer has reverse dispersibility, the light incident into the reflective circular polarizer is converted into more ideal circularly polarized light, and stray light can be further reduced, which is preferable.

In addition, in the virtual image display device according to the embodiment of the present invention, as the transparent display, a combination of a transparent screen including a cholesteric liquid crystal layer and a projector may be used. In this case, an image projected from the projector to the transparent screen can be used as the image that forms the virtual image $V_1$. In this case, the cholesteric liquid crystal layer reflects only right circularly polarized light or left circularly polarized light depending on the helical turning direction (sense) of the liquid crystal compound. This state can be used as the first polarization state. Further, in this case, the light of the scenery incident from the scenery side of the transparent screen including the cholesteric liquid crystal layer is in the second polarization state orthogonal to the first polarization state. This way, in a case where the transparent screen including the cholesteric liquid crystal layer is used as the transparent display, at least a part of a ray that forms the virtual image $V_1$ can be made to be in a first polarization state immediately before being incident into the optical system, and that at least a part of the ray that is incident from a back surface of the transparent display and transmits through the transparent display can be made to be in a second polarization state orthogonal to the first polarization state immediately before being incident into the optical system.

The transparent screen including the cholesteric liquid crystal layer will be described below.

Here, the virtual image display device according to the embodiment of the present invention may have a configuration in which an infrared lighting device is provided on a back side of the transparent display, and the infrared lighting device lights eyes of a user through the optical system.

In addition, the virtual image display device according to the embodiment of the present invention may have a configuration in which an infrared sensor is provided on a back side of the transparent display, and the infrared sensor lights eyes of a user through the optical system.

Figure 14:
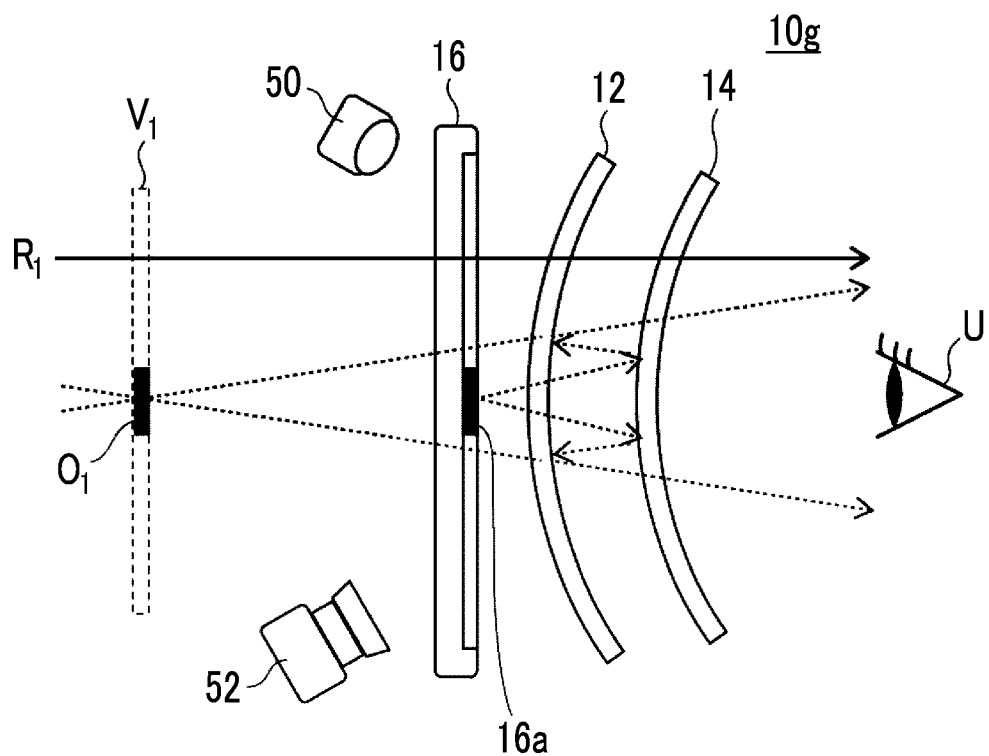
FIG. 14 is a diagram conceptually showing another example of the virtual image display device according to the present invention.

FIG. 14 is a diagram conceptually showing another example of the virtual image display device according to the embodiment of the present invention.

A virtual image display device 10g shown in FIG. 14 includes the transparent display 16 and the optical system including the half mirror 12 and the reflective polarizer 14 in this order, in which an infrared lighting device 50 and an infrared sensor 52 are provided on the back side of the transparent display 16, that is, on a side opposite to the surface where the optical system is disposed.

The virtual image display device 10g shown in FIG. 14 includes the same optical system as the virtual image display device 10a shown in FIG. 1. Accordingly, in the virtual image display device 10g, the scenery and the virtual image $V_1$ can be displayed to be superimposed on each other due to the same action of the virtual image display device 10a.

The infrared lighting device 50 is disposed to emit infrared light to the transparent display 16 side and emits the infrared light to the eyes of the user U through the optical system.

As the infrared lighting device 50, a well-known infrared light source in the related art that emits infrared light can be appropriately used. Specifically, as the infrared light source, a well-known light source such as a light emitting diode (LED), an organic light emitting diode (OLED), an infrared laser, a vertical cavity surface emitting laser (VCSEL), a globar, a xenon lamp, or a halogen lamp can be used.

The infrared sensor 52 is disposed such that a light-receiving surface faces the transparent display 16 side, and images the eyes of the user U through the optical system. That is, the infrared sensor 52 detects infrared light reflected from the eyes of the user and/or a peripheral portion of the eyes.

As the infrared sensor 52, a combination of a photoelectric conversion element such as a CCD sensor or a CMOS sensor and an infrared light filter that allows transmission of infrared light, an infrared camera, or the like can be used.

The virtual image display device 10g includes the infrared lighting device 50 and the infrared sensor 52, in which the infrared sensor 52 detects infrared light emitted from the infrared lighting device 50 and reflected from the eyes of the user U and/or a peripheral portion of the eyes. Based on the amount of the infrared light detected by the infrared sensor 52, the image acquired with the infrared light, and the like, an eye direction and the like of the user U can be detected. As a method of detecting (calculating) the eye direction of the user U using the infrared light, a well-known method in the related art may be used.

By detecting the eye direction of the user U of the virtual image display device 10g using infrared light, the performance of the virtual image display device can be improved. For example, the virtual image display device can focus on a region that is being seen by the user U or the resolution of a region that is being seen by the user U can be improved.

In addition, a plurality of the infrared lighting devices 50 and/or a plurality of the infrared sensors 52 may be provided.

Next, the components of the virtual image display device will be described.

(Half Mirror)

The half mirror is a well-known half mirror in the related art that allows transmission of about half of incident light and reflects the remaining half of the incident light. The transmittance of the half mirror is preferably 50±30%, more preferably 50±10%, and most preferably 50%. The half mirror has a configuration in which, for example, a reflective layer formed of a metal such as silver or aluminum is provided on a substrate formed of a transparent resin such as polyethylene terephthalate (PET), a cycloolefin polymer (COP), or polymethyl methacrylate (PMMA), glass, or the like. The reflective layer formed of a metal such as silver or aluminum is formed on a surface of the substrate by vapor deposition or the like. The thickness of the reflective layer is preferably 1 to 20 nm, more preferably 2 to 10 nm, and still more preferably 3 to 6 nm. In addition, it is preferable that the substrate does not have a retardation.

In a configuration in which the half mirror 12 has an action of a concave mirror, the half mirror 12 itself may have a concave shape as in the example shown in FIG. 1 or the like. Alternatively, the half mirror 12 may be configured by a diffraction element or the like to be a flat half mirror that acts as a concave mirror.

Figure 15:
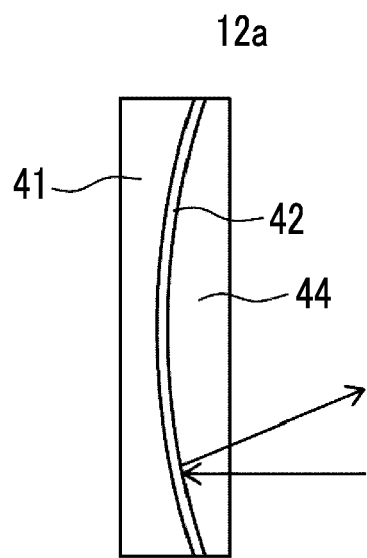
FIG. 15 is a diagram conceptually showing an example of a half mirror.
Figure 16:
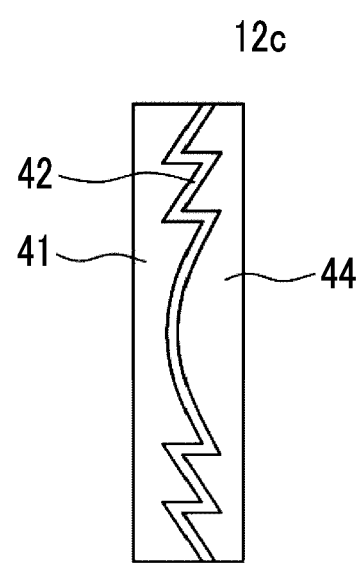
FIG. 16 is a diagram conceptually showing another example of the half mirror.

FIGS. 15 and 16 shows an example of the flat half mirror.

A half mirror 12a shown in FIG. 15 includes: a transparent support 41 that has a concave surface; a reflecting surface 42 that is formed on the concave surface of the support 41; and a coating layer 44 that is laminated on a surface of the reflecting surface 42 opposite to the support 41.

The support 41 is formed of a transparent resin such as polyethylene terephthalate (PET), a cycloolefin polymer (COP), or polymethyl methacrylate (PMMA), glass, or the like, in which one surface (concave surface) has a concave portion obtained by cutting out a part of a spherical surface or a paraboloidal surface.

A material, a forming method, and the like of the reflecting surface 42 are the same as those of a reflecting surface of a general half mirror. For example, the reflecting surface 42 can be formed on the concave surface of the support 41 by vapor deposition or the like of a metal such as silver or aluminum. The thickness is preferably 1 to 20 nm, more preferably 2 to 10 nm, and still more preferably 3 to 6 nm. In addition, it is preferable that the support 41 does not have a retardation.

The half mirror 12a allows transmission of half of incident light and reflects half of the incident light, and the reflecting surface 42 is formed in a concave surface shape. As a result, the half mirror 12a has a function of a concave mirror that collects reflected light.

In addition, in a preferable aspect, the half mirror 12a in the example shown in the drawing includes the coating layer 44 that is laminated on a surface of the reflecting surface 42 opposite to the support 41. It is preferable that the coating layer 44 is transparent. In addition, it is preferable that the coating layer 44 is formed of a material having substantially the same refractive index as the support 41. In addition, it is preferable that the coating layer 44 does not have a retardation. Further, it is preferable that a surface of the support 41 opposite to the reflecting surface 42 and a surface of the coating layer 44 opposite to the reflecting surface 42 are flat surfaces parallel to each other.

In a case where the coating layer 44 is not provided, light transmitted through the half mirror 12a is bent due to the influence of the concave surface of the support 41. Therefore, an image of the light transmitted through the half mirror 12a undergoes an enlargement or reduction action.

On the other hand, the half mirror 12a includes the coating layer 44 having substantially the same refractive index as the support 41, and the surfaces of the support 41 and the coating layer 44 are flat surfaces parallel to each other. As a result, light transmitted through the half mirror 12a can be prevented from being bent due to the influence of the concave surface of the support 41, and an image of the light transmitted through the half mirror 12a can be prevented from undergoing the enlargement or reduction action. As a result, in the virtual image display device according to the embodiment of the present invention, the scenery can be prevented from being enlarged or reduced or from being distorted.

The refractive index of the support 41 and the refractive index of the coating layer 44 do not need to be exactly the same as long as the above-described effect can be obtained, and may have a difference within a range where the effect can be obtained. The difference between the refractive index of the support 41 and the refractive index of the coating layer 44 is preferably 0.1 or less, more preferably 0.05 or less, and still more preferably 0.01 or less.

FIG. 16 is a cross-sectional view showing an example of the half mirror as the Fresnel mirror.

A half mirror 12c shown in FIG. 16 includes: the transparent support 41 where a groove having a Fresnel lens shape; the reflecting surface 42 that is formed on the surface of the support 41 where the Fresnel lens is formed; and the coating layer 44 that is laminated on a surface of the reflecting surface 42 opposite to the support 41.

The support 41 is formed of a transparent resin such as polyethylene terephthalate (PET), a cycloolefin polymer (COP), or polymethyl methacrylate (PMMA), glass, or the like, in which one surface has a well-known Fresnel lens shape.

A material, a forming method, and the like of the reflecting surface 42 are the same as those of a reflecting surface of a general half mirror. For example, the reflecting surface 42 can be formed on the surface of the support 41 where the groove having a Fresnel lens shape is formed by vapor deposition or the like of a metal such as silver or aluminum. The thickness is preferably 1 to 20 nm, more preferably 2 to 10 nm, and still more preferably 3 to 6 nm. In addition, it is preferable that the support 41 does not have a retardation.

The half mirror 12c allows transmission of half of incident light and reflects half of the incident light, and the reflecting surface 42 is formed in a Fresnel mirror shape. As a result, the half mirror 12c has a function of a concave mirror that collects reflected light due to the same action of the concave mirror.

In addition, in a preferable aspect, the half mirror 12c in the example shown in the drawing also includes the coating layer 44 that is laminated on a surface of the reflecting surface 42 opposite to the support 41. It is preferable that the coating layer is transparent, and the difference between the refractive index of the support 41 and the refractive index of the coating layer 44 is preferably 0.1 or less, more preferably 0.05 or less, and still more preferably 0.01 or less. In addition, it is preferable that the coating layer 44 does not have a retardation.

(Reflective Polarizer)

The reflective polarizer includes a reflective polarizer, and the reflective polarizer forms a reflecting surface of the reflective polarizer and allows transmission of light having one polarization state in incident light and reflects polarized light orthogonal to the polarized light.

The reflective polarizer is not particularly limited, and various reflective polarizers can be used.

The reflective polarizer is basically a reflective linear polarizer or a reflective circular polarizer.

The reflective linear polarizer is a polarizer that allows transmission of linearly polarized light in one direction and reflects linearly polarized light in a direction orthogonal to the linearly polarized light.

Examples of the reflective linear polarizer include a film obtained by stretching a dielectric multi-layer film described in JP2011-053705A and a wire grid polarizer described in JP2015-028656A. In addition, as the reflective linear polarizer, a commercially available product can be suitably used. Examples of the reflective linear polarizer as the commercially available product include a reflective polarizer (trade name: APF) manufactured by 3M and a wire grid polarizer (trade name: WGF) manufactured by AGC Inc.

The reflective circular polarizer is a polarizer that allows transmission of right circularly polarized light and left circularly polarized light and reflects circularly polarized light having a turning direction opposite to that of the transmitted circularly polarized light.

Examples of the reflective circular polarizer include a reflective circular polarizer including a cholesteric liquid crystal layer. The cholesteric liquid crystal layer is a liquid crystal phase obtained by immobilizing a cholesterically aligned liquid crystal phase (cholesteric liquid crystalline phase).

As is well known, the cholesteric liquid crystal layer has a helical structure in which the liquid crystal compound is helically turned and laminated. In the helical structure, a configuration in which the liquid crystal compound is helically rotated once (rotated by 360°) and laminated is set as one helical pitch (helical pitch), and plural pitches of the helically turned liquid crystal compounds are laminated.

The cholesteric liquid crystal layer reflects left circularly polarized light or right circularly polarized light in a specific wavelength range and allows transmission of the other light depending on the length of the helical pitch and the helical turning direction (sense) of the liquid crystal compound.

Accordingly, in a case where the virtual image display device displays a color image, the reflective circular polarizer may include, for example, a plurality of cholesteric liquid crystal layers including a cholesteric liquid crystal layer that has a central wavelength of selective reflection for red light, a cholesteric liquid crystal layer that has a central wavelength of selective reflection for green light, and a cholesteric liquid crystal layer that has a central wavelength of selective reflection for blue light.

In addition, in a case where the reflective circular polarizer includes a cholesteric liquid crystal layer, a support and an alignment film for aligning a liquid crystal compound in the cholesteric liquid crystal layer may be provided.

The thickness of the reflective polarizer may be appropriately adjusted depending on the kind of the reflective polarizer and the like such that polarized light to be reflected can be sufficiently reflected and polarized light to be transmitted can be sufficiently transmitted.

In a configuration in which the reflective polarizer 14 has an action of a concave mirror, the reflective polarizer 14 itself may have a concave shape as in the example shown in FIG. 3 or the like. Alternatively, the reflective polarizer 14 may be configured by a diffraction element or the like to be a flat reflective polarizer that acts as a concave mirror.

Examples of the flat reflective polarizer 14 include various half mirrors shown in FIGS. 15 and 16 where the reflecting surface 42 is replaced with the reflective linear polarizer or the reflective circular polarizer described above.

The reflective polarizer may be a liquid crystal diffraction element that includes a cholesteric liquid crystal layer having, in a radial shape, a liquid crystal alignment pattern in which a direction of an optical axis derived from a liquid crystal compound is continuously rotating in one in-plane direction in any of surfaces.

Figure 17:
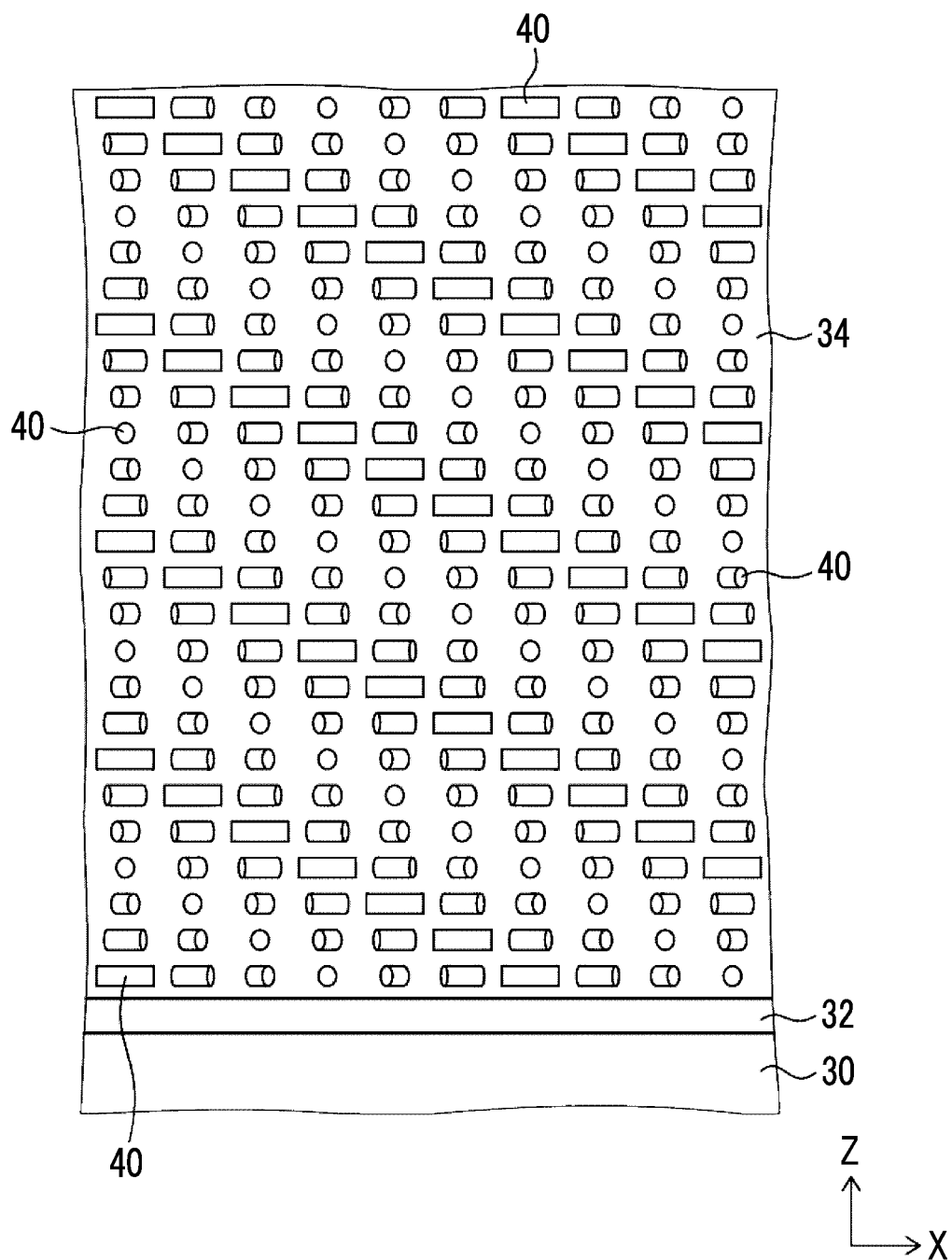
FIG. 17 is a cross-sectional view conceptually showing an example of a liquid crystal diffraction element used as a reflective polarizer.
Figure 18:
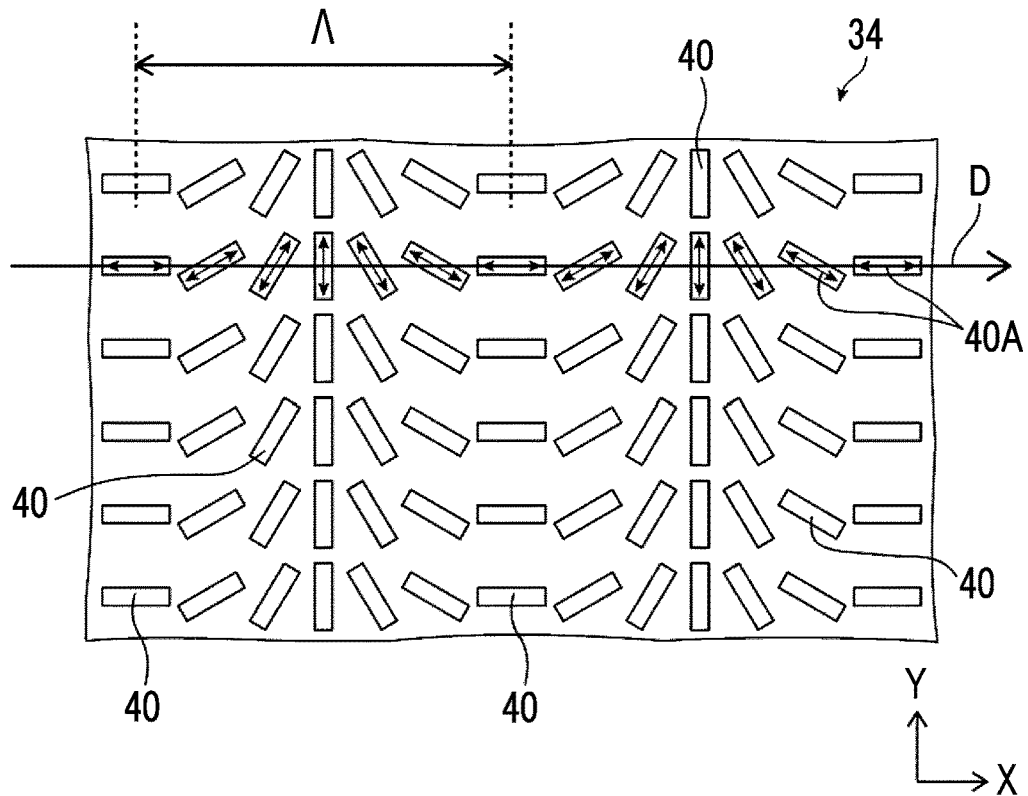
FIG. 18 is a partially enlarged view of a plan view showing the liquid crystal diffraction element shown in FIG. 17.
Figure 19:
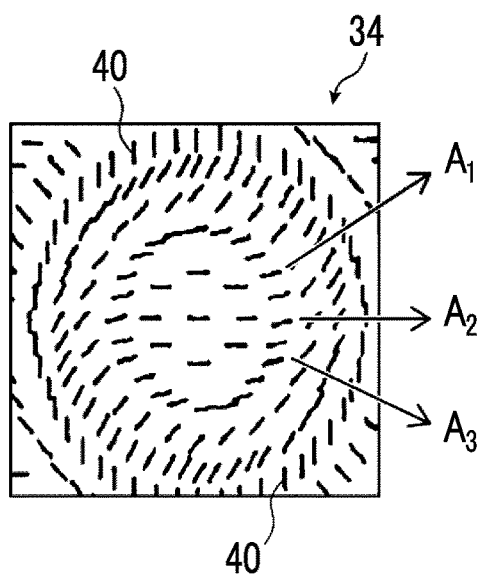
FIG. 19 is a plan view showing the liquid crystal diffraction element.

FIGS. 17 to 19 are diagrams illustrating the liquid crystal diffraction element (cholesteric liquid crystal layer) including the reflective polarizer. FIG. 17 is a cross-sectional view conceptually showing the liquid crystal diffraction element. FIG. 18 is a plan view showing the liquid crystal diffraction element (cholesteric liquid crystal layer) shown in FIG. 17. FIG. 19 is a plan view showing a configuration of the liquid crystal diffraction element.

The liquid crystal diffraction element shown in FIGS. 17 and 18 includes a cholesteric liquid crystal layer 34 that is obtained by immobilizing a cholesteric liquid crystalline phase and has a liquid crystal alignment pattern in which a direction of an optical axis derived from a liquid crystal compound changes while continuously rotating in one in-plane direction.

In the example shown in FIG. 17, the liquid crystal diffraction element includes a support 30, an alignment film 32, and the cholesteric liquid crystal layer 34.

In the example shown in FIG. 17, the liquid crystal diffraction element includes the support 30, the alignment film 32, and the cholesteric liquid crystal layer 34. However, the present invention is not limited to this configuration. The liquid crystal diffraction element may include only the alignment film 32 and the cholesteric liquid crystal layer 34 by peeling off the support 30. Alternatively, the liquid crystal diffraction element may include only the cholesteric liquid crystal layer 34 by peeling off the support 30 and the alignment film 32.

<Cholesteric Liquid Crystal Layer>

The cholesteric liquid crystal layer 34 is a cholesteric liquid crystal layer that is obtained by immobilizing a cholesteric liquid crystalline phase and has, in a radial shape, a liquid crystal alignment pattern in which a direction of an optical axis derived from a liquid crystal compound changes while continuously rotating in one in-plane direction in any of surfaces. In the cholesteric liquid crystal layer having the liquid crystal alignment pattern in which the direction of the optical axis derived from the liquid crystal compound changes while continuously rotating in one in-plane direction in any of surfaces, an arrangement direction of bright portions and dark portions derived from the cholesteric liquid crystalline phase observed with a SEM in a cross-section perpendicular to the main surface of the cholesteric liquid crystal layer is tilted with respect to the main surface of the cholesteric liquid crystal layer.

As conceptually shown in FIG. 17, the cholesteric liquid crystal layer 34 has a helical structure in which the liquid crystal compound 40 is helically turned in a thickness direction and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch, and plural pitches of the helically turned liquid crystal compounds 40 are laminated.

As is well-known, the cholesteric liquid crystal layer obtained by immobilizing a cholesteric liquid crystalline phase has wavelength-selective reflectivity. Although described below in detail, the selective reflection wavelength range of the cholesteric liquid crystal layer depends on the length of one helical pitch described above in the thickness direction.

Accordingly, the liquid crystal diffraction element may adjust the helical pitch P of the cholesteric liquid crystal layer depending on a wavelength of reflection.

As shown in FIG. 18, in the plan view (X-Y plane) of the cholesteric liquid crystal layer 34, the liquid crystal compounds 40 are arranged along a plurality of arrangement axes D in the X-Y plane. On each of the arrangement axes D, the direction of the optical axis 40A of the liquid crystal compound 40 changes while continuously rotating in the one in-plane direction along the arrangement axis D. In the region shown in FIG. 18, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 18, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the cholesteric liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length A of the single period in the liquid crystal alignment pattern.

That is, a distance between centers of two liquid crystal compounds 40 in the arrangement axis D direction is the length A of the single period, the two liquid crystal compounds having the same angle in the arrangement axis D direction. Specifically, as shown in FIG. 18, a distance between centers in the arrangement axis D direction of two liquid crystal compounds 40 in which the arrangement axis D direction and the direction of the optical axis 40A match each other is the length A of the single period. In the following description, the length A of the single period will also be referred to as "single period Λ".

In the liquid crystal alignment pattern of the cholesteric liquid crystal layer 34, the single period Λ is repeated in the arrangement axis D direction, that is, in the one in-plane direction in which the direction of the optical axis 40A changes while continuously rotating.

In a case where the X-Z plane of the cholesteric liquid crystal layer 34 shown in FIG. 17 is observed with a scanning electron microscope (SEM), a stripe pattern where an arrangement direction is tilted at a predetermined angle with respect to the main surface (X-Y plane) is observed, the arrangement direction being a direction in which bright portions and dark portions derived from the direction of the liquid crystal compound 40 are alternately arranged. In this SEM cross-section, an interval between the bright portions adjacent to each other or between the dark portions adjacent to each other in a normal direction of lines formed by the bright portions or the dark portions corresponds to a ½ pitch.

Hereinafter, an action of diffraction of the cholesteric liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with a SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

On the other hand, the cholesteric liquid crystal layer 34 having the configuration in which the arrangement direction of the bright portions and the dark portions is tilted reflects incident light in a state where it is tilted in the arrangement axis D direction with respect to the specular reflection. The cholesteric liquid crystal layer 34 has the liquid crystal alignment pattern in which the optical axis 40A changes while continuously rotating in the arrangement axis D direction in a plane (the predetermined one in-plane direction).

For example, the cholesteric liquid crystal layer 34 selectively reflects right circularly polarized light of red light. Accordingly, in a case where light is incident into the cholesteric liquid crystal layer 34, the cholesteric liquid crystal layer 34 reflects only right circularly polarized light of red light and allows transmission of the other light.

Here, in the cholesteric liquid crystal layer 34, the optical axis 40A of the liquid crystal compound 40 changes while rotating in the arrangement axis D direction (the one in-plane direction). In addition, the liquid crystal alignment pattern formed in the cholesteric liquid crystal layer 34 is a pattern that is periodic in the arrangement axis D direction. Therefore, the right circularly polarized light of red light incident into the cholesteric liquid crystal layer 34 is reflected (diffracted) in a direction corresponding to the period of the liquid crystal alignment pattern, and the reflected right circularly polarized light of red light is reflected (diffracted) in a direction tilted with respect to the X-Y plane (the main surface of the cholesteric liquid crystal layer) in the arrangement axis D direction.

Accordingly, in the cholesteric liquid crystal layer 34, by appropriately setting the arrangement axis D direction as the one in-plane direction in which the optical axis 40A rotates, the reflection direction of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

That is, in FIGS. 17 and 18, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

In the liquid crystal layer having the liquid crystal alignment pattern, as the single period Λ decreases, the angle of reflected light with respect to the incidence light increases. That is, as the single period Λ decreases, reflected light can be reflected in a state where it is largely tilted with respect to incidence light. Accordingly, the single period of the liquid crystal alignment pattern in the liquid crystal layer of each of the diffraction elements may be appropriately set depending on the diffraction angles, arrangement, and the like of the diffraction elements.

The periods (single periods Λ) of the diffraction structures of the diffraction elements are preferably 0.1 μm to 10 μm, more preferably 0.1 μm to 1 μm, still more preferably 0.1 μm to 0.8 μm, and still more preferably a wavelength λ or less of incident light.

Further, as shown in FIG. 19, the cholesteric liquid crystal layer 34 has arrangement axes in the liquid crystal alignment pattern in a radial shape. That is, as shown in FIG. 19, the arrangement axes ($A_1$ to $A_3$ . . . ) are present to extend in different directions from the center.

This way, in the cholesteric liquid crystal layer 34 having the radial liquid crystal alignment pattern, that is, the liquid crystal alignment pattern in which the optical axis changes while continuously rotating in a radial shape, incidence light can be reflected as diverging light or converging light depending on the rotation direction of the optical axis of the liquid crystal compound 40 and the direction of circularly polarized light to be reflected.

That is, by setting the liquid crystal alignment pattern (arrangement axes) of the cholesteric liquid crystal layer in a radial shape, the liquid crystal diffraction element exhibits, for example, a function as a concave mirror or a convex mirror.

Here, in a case where the liquid crystal alignment pattern of the cholesteric liquid crystal layer is radial such that the optical element functions as a concave mirror, it is preferable that the length of the single period Λ over which the optical axis rotates by 180° in the liquid crystal alignment pattern gradually decreases from the center of the cholesteric liquid crystal layer toward the outer direction in the one in-plane direction in which the optical axis continuously rotates.

Figure 20:
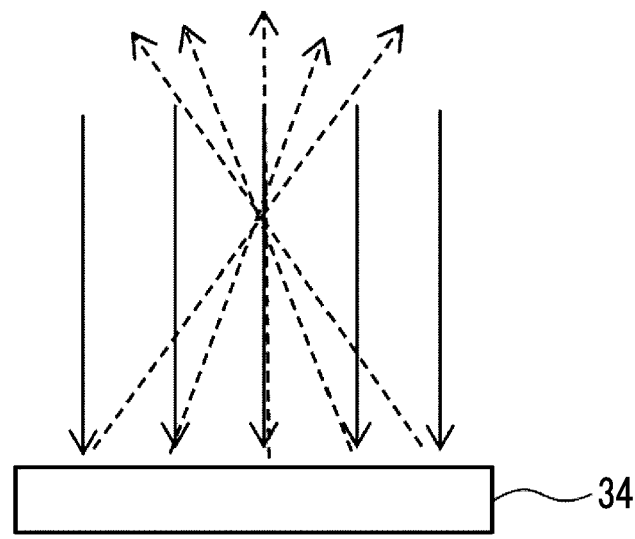
FIG. 20 is a diagram showing an action of the liquid crystal diffraction element.

As described above, the reflection angle of light with respect to an incidence direction increases as the length of the single period Λ in the liquid crystal alignment pattern decreases. Accordingly, the length of the single period Λ in the liquid crystal alignment pattern gradually decreases from the center of the cholesteric liquid crystal layer toward the outer direction in the one in-plane direction in which the optical axis continuously rotates. As a result, as shown in FIG. 20, the reflection angle increases toward the outer side of the liquid crystal diffraction element, light can be further collected, and the performance as a concave mirror can be improved.

In the present invention, depending on the uses of the liquid crystal diffraction element, conversely, the length of the single period Λ in the radial liquid crystal alignment pattern may gradually increase from the center of the cholesteric liquid crystal layer toward the outer direction in the one in-plane direction in which the optical axis continuously rotates.

Further, depending on the uses of the liquid crystal diffraction element, a configuration in which regions having partially different lengths of the single periods Λ in the one in-plane direction in which the optical axis continuously rotates are provided can also be used instead of the configuration in which the length of the single period Λ gradually changes in the one in-plane direction in which the optical axis continuously rotates.

Here, the example shown in FIG. 17 shows the configuration in which, on the X-Z plane of the cholesteric liquid crystal layer 34, the optical axis 40A of the liquid crystal compound 40 is aligned to be parallel to the main surface (X-Y plane). However, the present invention is not limited to this configuration. For example, a configuration in which, on the X-Z plane of the cholesteric liquid crystal layer 34, the optical axes 40A of the liquid crystal compound 40 is aligned to be tilted with respect to the main surface (X-Y plane) may be adopted.

In addition, in the X-Z plane of the cholesteric liquid crystal layer 34, the tilt angle of the liquid crystal compound 40 with respect to the main surface (X-Y plane) may be uniform in the thickness direction (Z direction), and a region where the tilt angle of the liquid crystal compound 40 varies in the thickness direction may be provided.

For example, a configuration may be adopted in which the optical axis 40A of the liquid crystal compound 40 at an interface of the cholesteric liquid crystal layer on the alignment film 32 side is parallel to the main surface (the pretilt angle is 0°), the tilt angle of the liquid crystal compound 40 increases in a direction away from the interface on the alignment film 32 side to the thickness direction, and the liquid crystal compound is aligned at a given tilt angle on another interface (air interface) side.

This way, the cholesteric liquid crystal layer may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 50°. The average tilt angle can be measured by observing the X-Z plane of the cholesteric liquid crystal layer 34 with a polarization microscope. In particular, it is preferable that, on the X-Z plane of the cholesteric liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the liquid crystal diffraction element (cholesteric liquid crystal layer) travels obliquely in an oblique direction in the cholesteric liquid crystal layer along with a bending force. In a case where light travels in the cholesteric liquid crystal layer, diffraction loss is generated due to a deviation from conditions such as a diffraction period that are set to obtain a desired diffraction angle originally with respect to the vertically incident light.

In a case where the liquid crystal compound is tilted, an orientation in which a higher birefringence index is generated with respect to an orientation in which light is diffracted is present as compared to a case where the liquid crystal compound is not tilted. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is desirable that the tilt angle is controlled by treating the interface of the liquid crystal layer. By pretilting the alignment film on the support side interface, the tilt angle of the liquid crystal compound can be controlled. For example, by obliquely exposing the alignment film to ultraviolet light from the front during the formation of the alignment film, the liquid crystal compound in the cholesteric liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the cholesteric liquid crystal layer or to the alignment film. In this case, the additive can be used as a factor for further improving the diffraction efficiency.

This additive can also be used for controlling the pretilt angle on the air side interface.

Here, in the cholesteric liquid crystal layer, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the cholesteric liquid crystal layer is tilted with respect to the main surface and the tilt direction substantially matches with the bright portions and the dark portions of the cholesteric liquid crystal layer. The normal direction is a direction perpendicular to the main surface.

By the cholesteric liquid crystal layer having the above-described configuration, circularly polarized light can be diffracted with a higher diffraction efficiency than the cholesteric liquid crystal layer in which the liquid crystal compound is parallel to the main surface.

In the configuration in which the liquid crystal compound of the cholesteric liquid crystal layer is tilted with respect to the main surface and the tilt direction substantially matches the bright portions and the dark portions, bright portions and dark portions substantially corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In a fast axis plane or a slow axis plane of the cholesteric liquid crystal layer, the absolute value of the optical axis tilt angle of the cholesteric liquid crystal layer is preferably 5° or more, more preferably 15° or more, and still more preferably 20° or more.

It is preferable that the absolute value of the tilt angle of the optical axis is 15° or more from the viewpoint that the direction of the liquid crystal compound matches the bright portions and the dark portions more suitably such that the diffraction efficiency can be improved.

<<Method of Forming Cholesteric Liquid Crystal Layer>>

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-like liquid crystal compound or a disk-like liquid crystal compound.

Examples of the rod-like polymerizable liquid crystal compound for forming the cholesteric liquid crystalline phase include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01 to 200 mol % and more preferably 1 to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. The crosslinking agents may be used alone or in combination of two or more kinds.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. The organic solvents may be used alone or in combination of two or more kinds. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film 32, it is preferable that the cholesteric liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

In addition, as a method of forming the cholesteric liquid crystal layer, a method of forming a tilted liquid crystal layer that is formed of a composition including a disk-like liquid crystal compound and in which a molecular axis of the disk-like liquid crystal compound is tilted with respect to the surface and forming a cholesteric liquid crystal layer on the tilted liquid crystal layer using a composition including a liquid crystal compound is suitably used.

The method of forming the cholesteric liquid crystal layer using the tilted liquid crystal layer is described in paragraphs "0049" to "0194" of WO2019/181247A.

The thickness of the cholesteric liquid crystal layer is not particularly limited, and the thickness with which a required light reflectivity can be obtained may be appropriately set depending on the use of the liquid crystal diffraction element, the light reflectivity required for the cholesteric liquid crystal layer, the material for forming the cholesteric liquid crystal layer, and the like.

Here, the liquid crystal diffraction element may be configured to include one cholesteric liquid crystal layer having wavelength selectivity or to include two or more cholesteric liquid crystal layers having wavelength selectivity.

In a case where the liquid crystal diffraction element includes two or more cholesteric liquid crystal layers, it is preferable that selective reflection center wavelengths of the two or more cholesteric liquid crystal layers are different from each other.

For example, the liquid crystal diffraction element may include two cholesteric liquid crystal layers including a cholesteric liquid crystal layer that selectively reflects red light and a cholesteric liquid crystal layer that selectively reflects green light, and may include three cholesteric liquid crystal layers including a cholesteric liquid crystal layer that selectively reflects red light, a cholesteric liquid crystal layer that selectively reflects green light, and a cholesteric liquid crystal layer that selectively reflects blue light.

In a case where the liquid crystal diffraction element includes a plurality of cholesteric liquid crystal layers, for example, the cholesteric liquid crystal layers are configured to reflect three color light components including red light, green light, and blue light, respectively, such that a color image displayed by the virtual image display device and a white image can be guided.

For example, the liquid crystal diffraction element also may be configured to include three cholesteric liquid crystal layers having different selective reflection center wavelengths and to reflect not only light of one color or two colors selected from visible light such as red light, green light, or blue light but also infrared light and/or ultraviolet light.

Alternatively, the liquid crystal diffraction element may include two or four or more cholesteric liquid crystal layers having different selective reflection center wavelengths. In addition, the liquid crystal diffraction element may be configured to reflect light other than visible light such as infrared light and/or ultraviolet light in addition to visible light such as red light, green light, and blue light. Alternatively, each of the cholesteric liquid crystal layers may be configured to reflect light other than visible light such as infrared light and/or ultraviolet light.

In addition, in a case where the liquid crystal diffraction element includes two or more cholesteric liquid crystal layers, it is preferable that lengths over which the directions of the optical axes derived from the liquid crystal compounds in the liquid crystal alignment patterns of the two or more cholesteric liquid crystal layers rotate by 180° in an in-plane direction, that is, single periods Λ of diffraction structures are different from each other.

Specifically, in a case where the pitches P of the cholesteric liquid crystal layers are different from each other, it is preferable that a permutation of the pitches P (the lengths of the selective reflection center wavelengths) and a permutation of the lengths of the single periods Λ in the liquid crystal alignment patterns of the cholesteric liquid crystal layers are the same as each other. As a result, the tilt angles of the bright portions and the dark portions in the SEM cross-sections of the cholesteric liquid crystal layers can be made to substantially match with each other, and the diffraction angles with respect to light having the selective reflection wavelengths of the cholesteric liquid crystal layers can be made to substantially match with each other. That is, light components having different wavelengths can be diffracted in substantially the same direction.

<Support>

The support 30 supports the alignment film 32 and the cholesteric liquid crystal layer 34.

As the support 30, various sheet-shaped materials (films or plate-shaped materials) can be used as long as they can support the alignment film 32 and the cholesteric liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the liquid crystal diffraction element, a material for forming the support 30, and the like in a range where the alignment film 32 and the cholesteric liquid crystal layer 34 can be supported.

The thickness of the support 30 is preferably 1 to 2000 µm, more preferably 3 to 500 µm, and still more preferably 5 to 250 µm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

In the liquid crystal diffraction element, the alignment film 32 is formed on a surface of the support 30.

The alignment film 32 is an alignment film for aligning the liquid crystal compound to a predetermined liquid crystal alignment pattern during the formation of the cholesteric liquid crystal layer 34.

As described above, in the present invention, the cholesteric liquid crystal layer 34 has, in a radial shape, a liquid crystal alignment pattern in which a direction of an optical axis (refer to FIG. 19) derived from the liquid crystal compound 40 changes while continuously rotating in one in-plane direction. Accordingly, the alignment film 32 is formed such that the cholesteric liquid crystal layer 34 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as w-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the liquid crystal diffraction element, the alignment film 32 can be suitably used as a so-called photo-alignment film obtained by irradiating a photo-alignment material with polarized light or non-polarized light. That is, in the liquid crystal diffraction element, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 21:
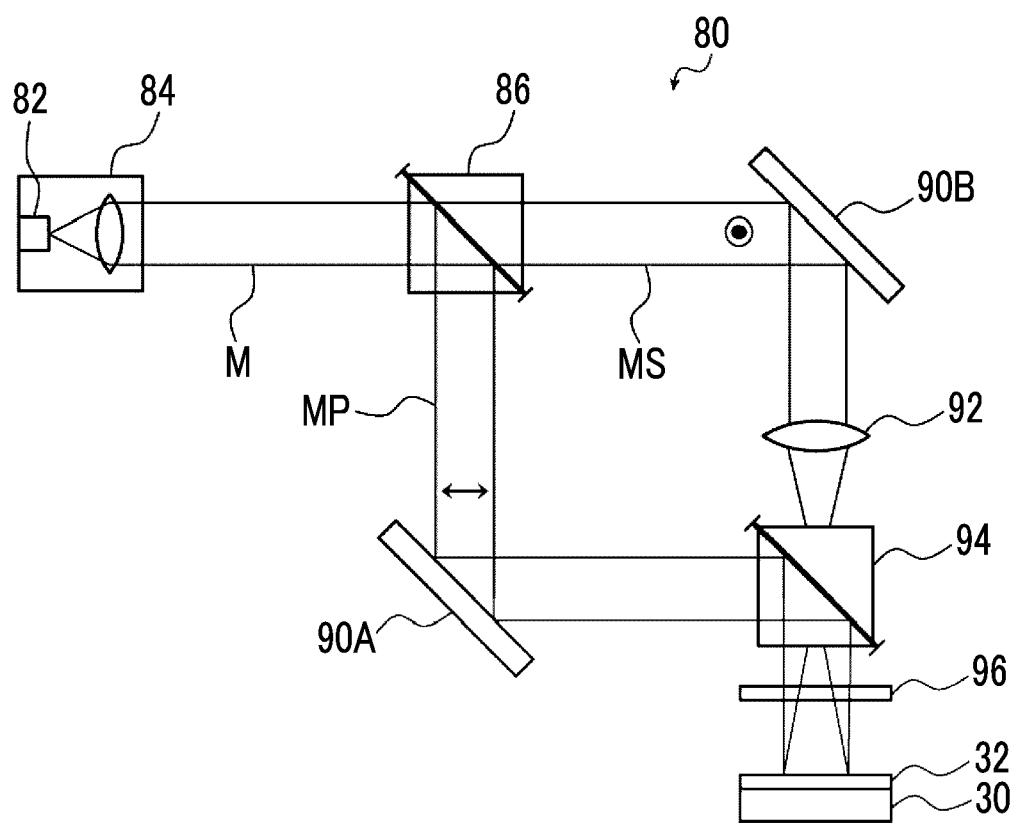
FIG. 21 is a conceptual diagram showing an example of an exposure device that exposes an alignment film.

FIG. 21 conceptually shows an example of an exposure device that exposes the alignment film 32 to form an alignment pattern in a radial shape.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are combined by the polarization beam splitter 94, are converted into right circularly polarized light and left circularly polarized light by the λ/4 plate 96 depending on the polarization direction, and are incident into the alignment film 32 on the support 30.

Here, due to interference between the right circularly polarized light and the left circularly polarized light, the polarization state of light with which the alignment film 32 is irradiated periodically changes according to interference fringes. The intersecting angle between the right circularly polarized light and the left circularly polarized light changes from the inner side to the outer side of the concentric circle. Therefore, an exposure pattern in which the pitch changes from the inner side to the outer side can be obtained. As a result, in the alignment film 32, a concentric circular alignment pattern in which the alignment state periodically changes can be obtained.

In the exposure device 80, the length A of the single period in the liquid crystal alignment pattern in which the optical axis of the liquid crystal compound 40 continuously rotates by 180° can be controlled by changing the refractive power of the lens 92 (the F number of the lens 92), the focal length of the lens 92, the distance between the lens 92 and the alignment film 32, and the like.

In addition, by adjusting the refractive power of the lens 92 (the F number of the lens 92), the length A of the single period in the liquid crystal alignment pattern in the one in-plane direction in which the optical axis continuously rotates can be changed. Specifically, in addition, the length A of the single period in the liquid crystal alignment pattern in the one in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length A of the single period in the liquid crystal alignment pattern gradually decreases from the inner side toward the outer side, and the F number increases. Conversely, in a case where the refractive power of the lens 92 becomes stronger, the length A of the single period in the liquid crystal alignment pattern rapidly decreases from the inner side toward the outer side, and the F number decreases.

(Polarization Separating Element)

The polarization separating element is an element that has a function of separating at least a part of the incident light into polarized light components orthogonal to each other. For example, the polarization separating element separates the incident light into right circularly polarized light and left circularly polarized light or into linearly polarized light components having orthogonal to each other.

As described above, it is preferable that the polarization separating element includes any of an active retardation layer, a patterned retardation layer, an active polarizer, or a patterned polarizer.

The active retardation layer is a retardation layer that is capable of switching a direction of a slow axis or a size of retardation.

As the active retardation layer capable of switching a direction of a slow axis, various well-known retardation layers can be used. Examples of the active retardation layer include an active retardation layer that is capable of switching a voltage to be applied to switch a direction of a slow axis (optical axis of a liquid crystal compound) to a direction orthogonal to the direction using a liquid crystal cell that acts as a ¼ wave plate, for example, as in an active shutter transparent display.

On the other hand, as the active retardation layer that is capable of switching a size of retardation, various well-known retardation layers can be used. Examples of the active retardation layer include an active retardation layer that is capable of switching a voltage to be applied to switch between, for example, a state where the retardation is zero and a state where the retardation is ½ wavelength using a liquid crystal cell such as a vertical alignment (VA) type.

In the present invention, the ¼ wave plate (¼ wave retardation plate) is a retardation plate having a retardation of about ¼ wavelength at any wavelength of visible light.

As the ¼ wave plate, for example, at a wavelength of 550 nm, a ¼ wave plate having a retardation of 120 nm to 150 nm is preferable, and a ¼ wave plate having a retardation of 130 nm to 140 nm is more preferable.

The patterned retardation layer includes a plurality of regions different in a direction of a slow axis and/or a size of retardation.

Examples of the patterned retardation layer having different directions of slow axes include a patterned retardation layer that is a ¼ wave plate and is divided into regions in a dot shape corresponding to the arrangement of pixels (emitters) of the transparent display and where directions of slow axes in adjacent regions are orthogonal to each other. In addition, examples of the patterned retardation layer having different sizes of retardation include a patterned retardation layer that is divided into regions and where a region having a retardation of ¼ wavelength and a region having a retardation of ¾ wavelength are alternately formed.

The patterned retardation layer may be prepared using a well-known method such as a method described in JP2012-008170A, a method described in JP2012-032661A, or the like. In addition, as the patterned retardation layer, a commercially available product can also be used.

In the above-described example, the active retardation layer capable of switching a direction of a slow axis and the patterned retardation layer that includes a plurality of regions different in a direction of a slow axis are described as representative examples. However, even an active retardation layer that is capable of switching a size of retardation and a patterned retardation layer that includes a plurality of regions different in a size of retardation can exhibit the same effects.

The active polarizer is a polarizer that is capable of switching a direction of a transmission axis or an absorption axis. The active polarizer switches, for example, a direction of absorption axis (transmission axis) between two directions orthogonal to each other.

As the active polarizer, various well-known polarizers can be used. Examples of the active polarizer include an active polarizer that changes an alignment direction of a dichroic coloring agent as described in JP2019-70781A by interposing a guest-host liquid crystal layer having a dichroic coloring agent between a pair of opposing electrode layers and applying a voltage thereto.

The patterned polarizer is a polarizer that includes a plurality of regions different in a direction of a transmission axis or an absorption axis. Examples of the patterned polarizer include a patterned retardation layer that is divided into regions in a dot shape corresponding to the arrangement of pixels (emitters) of the transparent display and where directions of transmission axes (absorption axes) in adjacent regions are orthogonal to each other.

As the patterned polarizer, for example, various well-known polarizers such as a patterned polarizer that includes two or more regions different in a direction of an absorption axis as described in JP2009-193014A can be used.

As described above, in the virtual image display device according to the embodiment of the present invention, in a case where the polarization separating element includes the active retardation layer or the active polarizer, the transparent display alternately switches between display and non-display of the virtual image $V_1$ (the image of the virtual image $V_1$) by time-division.

In other words, in a case where the polarization separating element includes the active retardation layer or the active polarizer, in a case where the scenery is displayed, the polarization separating element switches the direction of the slow axis or the transmission axis (absorption axis) such that the optical path of the scenery is obtained. In addition, in a case where the transparent display displays the virtual image $V_1$, the polarization separating element switches the direction of the slow axis or the transmission axis (absorption axis) such that the optical path of the virtual image $V_1$ is obtained.

On the other hand, in a case where the polarization separating element is the patterned retardation layer or the patterned polarizer, the transparent display displays the scenery and the virtual image $V_1$ (the image of the virtual image $V_1$) by division (by space-division).

As described above, in the light-emitting transparent display formed of an OLED or the like, fine emitters are arranged on a transparent substrate. The pattern of the polarization separating element is configured such that slow axes or transmission axes at position corresponding to the emitters and positions where the emitters are not disposed are orthogonal to each other.

(Transparent Screen Including Cholesteric Liquid Crystal Layer)

The transparent display according to the embodiment of the present disclosure may configured by a transparent screen and a projector. The transparent screen may be a transparent screen that includes a cholesteric liquid crystal layer including a liquid crystal compound. Hereinafter, the transparent screen that includes the cholesteric liquid crystal layer including the liquid crystal compound will be described in detail.

—Molecular Arrangement—

The cholesteric liquid crystal layer is a layer including a cholesteric liquid crystal. The cholesteric liquid crystal that is known as one aspect of the liquid crystal has a helical structure formed by helically arranging a plurality of liquid crystal compounds. In the helical structure, the molecular axis of the liquid crystal compound is substantially orthogonal to a helical axis derived from the liquid crystal compound (hereinafter, also simply referred to as "helical axis").

In a case where the cholesteric liquid crystal layer (for example, a cross-section of the cholesteric liquid crystal layer in the thickness direction) is observed with a scanning electron microscope or a polarization microscope, a stripe pattern including bright portions (referred to as regions that looks brighter; hereinafter, the same can be applied) and dark portions (referred to as regions that looks darker; hereinafter, the same can be applied) is observed. The stripe pattern is observed, for example, as a stripe pattern where the bright portions and the dark portions are alternately arranged. The reason why the stripe pattern is observed is that the direction of the molecular axis of the liquid crystal compound that forms the helical structure changes with respect to the observation direction. For example, a region where the direction of the molecular axis of the liquid crystal compound is parallel (including a position substantially parallel) to the observation direction looks brighter. On the other hand, a region where the direction of the molecular axis of the liquid crystal compound is orthogonal (including a position substantially orthogonal) to the observation direction looks darker. By alternately arranging the above-described two regions, the stripe pattern where the bright portions and the dark portions are alternately arranged is observed.

In the cross-sectional view of the cholesteric liquid crystal layer in the thickness direction, it is preferable that the helical axis derived from the liquid crystal compound of the cholesteric liquid crystal layer is tilted with respect to the normal line of at least one of two main surfaces of the cholesteric liquid crystal layer positioned opposite to each other. By tilting the helical axis as described above, the pattern where the refractive index periodically changes with respect to the main surface is formed such that the emitted light is diffracted. In the present disclosure, the aspect "the helical axis is tilted with respect to the normal line of the main surface" is not limited to a state where the helical axis is oblique to the normal line of the main surface of the cholesteric liquid crystal layer and also includes a state where the helical axis is orthogonal to the normal line of the main surface of the cholesteric liquid crystal layer (that is, an angle between the helical axis and the normal line of the main surface of the cholesteric liquid crystal layer is 90 degrees).

In the present disclosure, the cross-sectional view of the cholesteric liquid crystal layer in the thickness direction is observed with a scanning electron microscope or a polarization microscope. A sample used for the observing the cross-section may be prepared using a microtome.

The tilt of the helical axis (referred to as the state where the helical axis is tilted with respect to the normal line of the main surface; hereinafter, the same can be applied) may be observed in at least one cross-sectional view of the cholesteric liquid crystal layer in the thickness direction. For example, even in a case where the tilt of the helical axis is not observed in any one cross-sectional view, the tilt of the helical axis may be observed in another cross-sectional view. The reason for this is that the direction of the helical axis to be observed may change depending on the observation direction. In the cross-sectional view of the cholesteric liquid crystal layer in the thickness direction, in a case where the stripe pattern where the bright portions and the dark portions are alternately arranged is observed, the relevance of the tilt of the helical axis may be checked based on the above-described stripe pattern. The reason for this is that, in the stripe pattern where the bright portions and the dark portions are alternately arranged, the helical axis is substantially orthogonal to the arrangement direction of the bright portions and the dark portions.

In the cross-sectional view of the cholesteric liquid crystal layer in the thickness direction, an average angle of the helical axes is preferably 5 to 80 degrees, more preferably 8 degrees to 70 degrees, and still more preferably 10 degrees to 60 degrees with respect to the normal line of at least one of two main surfaces of the cholesteric liquid crystal layer positioned opposite to each other.

The average angle of the helical axes is obtained using the following method. Based on a cross-sectional image of the cholesteric liquid crystal layer obtained using a scanning electron microscope or a polarization microscope, each of angles between five helical axes and the normal line of the main surface of the cholesteric liquid crystal layer is measured. The value obtained by averaging the measured values is set as the average angle of the helical axes.

It is preferable that the liquid crystal compounds observed in at least one of two main surfaces of the cholesteric liquid crystal layer positioned opposite to each other are twisted and arranged in one of in-plane directions of the cholesteric liquid crystal layer. It is more preferable that the liquid crystal compounds observed in each of two main surfaces of the cholesteric liquid crystal layer positioned opposite to each other are twisted and arranged in one of in-plane directions of the cholesteric liquid crystal layer. By arranging the liquid crystal compounds as described above, an effect of diffracting light emitted from the main surface can be obtained.

In the present disclosure, "the liquid crystal compounds are twisted and arranged in one of in-plane directions of the cholesteric liquid crystal layer" represents that, in a case where the main surface (limited to the main surface to be observed) of the cholesteric liquid crystal layer is observed (that is, a plan view) using a scanning electron microscope or a polarization microscope, the stripe pattern where the bright portions and the dark portions are alternately arranged in one of in-plane directions of the cholesteric liquid crystal layer is observed.

Hereinafter, the above-described observation result will be described. By twisting and arranging the liquid crystal compounds in one direction of in-plane directions of the cholesteric liquid crystal layer, the direction of the molecular axis of the liquid crystal compound changes toward the one in-plane direction. The change in the direction of the molecular axis of the liquid crystal compound occurs because two liquid crystal compounds adjacent to each other in the one in-plane direction are present at twisted positions. The direction of the molecular axis of the liquid crystal compound changes toward the one in-plane direction such that the stripe pattern where the bright portions and the dark portions are alternately arranged is observed depending on the direction of the molecular axis of the liquid crystal compound with respect to the observation direction.

In the cross-sectional view of the cholesteric liquid crystal layer in the thickness direction, the average length of single pitches of the helical axes (that is, the length of the helical axis per helical turn) is preferably 0.1 μm or more, more preferably 0.2 μm or more, and still more preferably 0.3 μm or more. The reason for this is that, in a case where the average length of the single pitches of the helical axes is small, the diffraction angle of light (in particular, visible light) increases, and the visibility of a video on the screen front (the front surface of the main surface) deteriorates. From the viewpoint of the color reproducibility of the single pitch of the video, the average length of the single pitches of the helical axes is preferably 500 μm or less, more preferably 200 μm or less, and still more preferably 100 μm or less. In addition, the average length of the single pitches of the helical axes in a plane may change. The average length of the single pitches of the helical axes can be adjusted based on the amount of the chiral agent, the spontaneous twist amount of the chiral agent, and the like. The spontaneous twist amount of the chiral agent in a plane can be adjusted using photoisomerization.

In addition, it is preferable that the cholesteric liquid crystal layer adjusts the pitches such that the pitch of light close to a light source is large and the pitch of light far from the light source is small. By performing the adjustment such that the diffraction angle of the light close to the light source is small and the diffraction angle of light far from the light source is large, the visibility (the uniformity of brightness) of the transparent screen can be improved.

Here, the pitch is a projection component that is determined depending on the average length of the single pitches of the helical axes and the tilt angle thereof.

In addition, it is preferable that the cholesteric liquid crystal layer changes the direction of the helical axis in a minute region. As a result, not only a function of diffracting incidence light in one direction but also a function of scattering the incidence light in multiple directions can be added, and the effect of improving the color reproducibility of the video is obtained. The dimension of a minute region is desirably more than a light wavelength and is desirably, for example, 1 µm to 100 µm. In addition, the cholesteric layer is tilted with respect to a straight line orthogonal to at least one of two main surfaces positioned opposite to each other, and in the cross-sectional view of the thickness direction, a fluctuation range of the pitch lengths of the bright portions and the dark portions is preferably 0.1 µm or more and more preferably 0.3 µm or more. The upper limit of the fluctuation range of the pitch lengths of the bright portions and the dark portions is not limited. From the viewpoint of imparting the action of diffraction, the fluctuation range of the pitch lengths of the bright portions and the dark portions may be 100 µm or less or 80 µm or less.

With this configuration, the discreteness of the diffraction angle of light (in particular, visible light) can be suppressed. That is, the wavelength dependence of the intensity of light (in particular, visible light) that reaches an observer from the transparent screen can be suppressed from largely changing depending on observation positions (in particular, observation angles). Therefore, the video where the original tint is reproduced can be provided to the observer without being affected by the observation position.

The fluctuation range of the pitch lengths of the bright portions and the dark portions is measured using the following method.

(1) The cholesteric liquid crystal layer is cut in the thickness direction to obtain a cross-sectional image of the cholesteric liquid crystal layer using a scanning electron microscope or a polarization microscope.

(2) A plurality of virtual lines that are parallel to at least one of two main surfaces of the cholesteric liquid crystal layer positioned opposite to each other and divide the thickness of the cholesteric liquid crystal layer per 1 µm are drawn on the cholesteric liquid crystal layer in the cross-sectional image. Note that, in a case where the thickness of the cholesteric liquid crystal layer as a target is 2 µm or less, two virtual lines that equally divide the thickness of the cholesteric liquid crystal layer into three regions are drawn instead of "the plurality of virtual lines that divide the thickness of the cholesteric liquid crystal layer per 1 µm". The length of each of the virtual lines is 50 µm.

(3) The length of the virtual line in an intersection region between "the bright portion and the dark portion adjacent to each other" and "the virtual line" observed in the cross-sectional image is measured, and the obtained value is set as the pitch length of the bright portion and the dark portion. The measurement of the pitch length of the bright portion and the dark portion is performed along a virtual line of 50 µm, in other words, in a range of 50 µm. The value obtained by averaging the measured values is set as an average value AM1.

(4) An absolute value of a difference between the maximum value and the minimum value among the average values AM1 obtained using the respective virtual lines is obtained. The obtained value is set as the fluctuation range of the pitch lengths of the bright portions and the dark portions.

Examples of a method of adjusting the fluctuation range of the pitch lengths of the bright portions and the dark portions include a method of controlling an alignment restriction force applied to the liquid crystal compounds present in the vicinity of each of two main surfaces of the cholesteric liquid crystal layer positioned opposite to each other and a method of controlling the amount of the chiral agent. The alignment restriction force is controlled, for example, by an alignment control agent and an alignment layer.

The average length of the single pitches of the helical axes is obtained using the following method. Based on the cross-sectional image of the cholesteric liquid crystal layer obtained using the scanning electron microscope or the polarization microscope, the lengths of single pitches of five helical axes are measured. The value obtained by averaging the measured values is set as the average length of the single pitches of the helical axes. In the cross-sectional view of the cholesteric liquid crystal layer in the thickness direction, in a case where the stripe pattern where the bright portions and the dark portions are alternately arranged is observed, the length of the single pitch of the helical axis may be measured based on the above-described stripe pattern. The length of the single pitch of the helical axis in the stripe pattern corresponds to the distance from one end to another end of a region including two bright portions and three dark portions (dark portion-bright portion-dark portion-bright portion-dark portion).

Hereinafter, for reference, an example of a method of preparing the transparent screen including the cholesteric liquid crystal layer will be described.

[Use of Substrate]

As a substrate, an elongated triacetyl cellulose (TAC) film (manufactured by Fujifilm Corporation, refractive index: 1.48, thickness: 80 µm, width: 300 mm) was prepared.

[Formation of Alignment Layer]

In a container held at 80° C., a mixture including pure water (96 parts by mass) and PVA-205 (manufactured by Kuraray Co., Ltd., polyvinyl alcohol) was stirred to prepare a composition for forming an alignment layer. Using a bar (bar number: 6), the composition for forming an alignment layer was applied to the substrate (triacetyl cellulose film) and subsequently was dried in an oven at 100° C. for 10 minutes. Through the above-described procedures, the alignment layer (thickness: 2 µm) was formed on the substrate.

[Formation of Cholesteric Liquid Crystal Layer]

Through the following procedures, a cholesteric liquid crystal layer [thickness: 11 µm] was formed on the alignment layer.

(Preparation of Coating Liquid (1) for Forming Liquid Crystal Layer)

Components shown below were mixed and were filtered through a filter (pore diameter: 0.2 µm) formed of polypropylene to prepare a coating liquid (1) for forming a liquid crystal layer.

—Components—

(1) Rod-like thermotropic liquid crystal compound (the following compound (A)): 100 parts by mass
(2) Chiral agent (the following compound (B), Palicolor (registered trade name): LC756, manufactured by BASF SE): 1.2 parts by mass
(3) Photopolymerization initiator (IRGACURE (registered trade name) 907, manufactured by BASF SE): 3 parts by mass
(4) Photopolymerization initiator (PM758, manufactured by Nippon Kayaku Co., Ltd.): 1 part by mass
(5) Alignment control agent (the following compound (C)): 0.5 parts by mass
(6) Solvent (methyl ethyl ketone): 184 parts by mass
(7) Solvent (cyclohexanone): 31 parts by mass The compound (A) is a mixture of three compounds shown below. The contents of the compounds in the mixture are 84 mass %, 14 mass %, and 2 mass % in order from above.

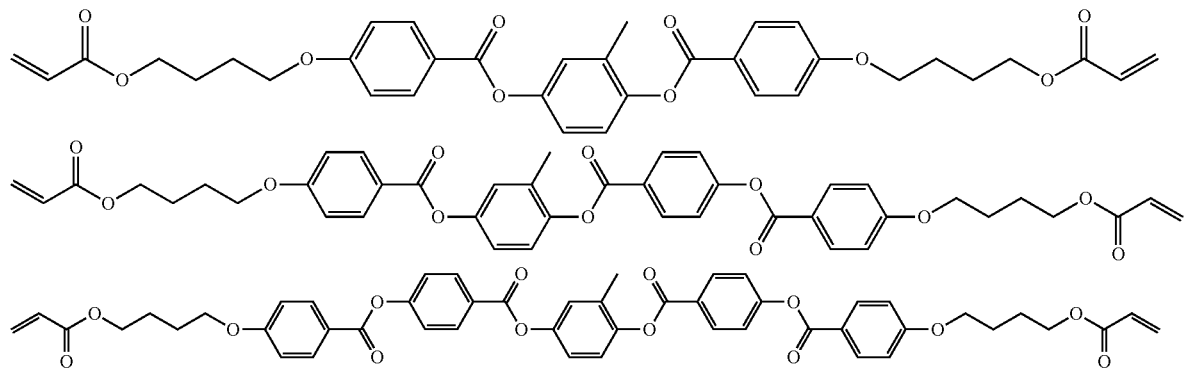

A chemical structure of the compound (B) is as follows.

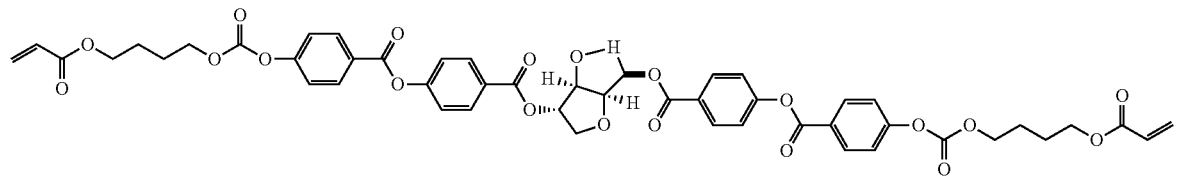

A chemical structure of the compound (C) is as follows.

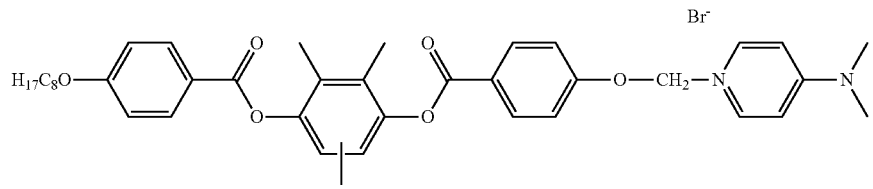

(Application)

The substrate including the alignment layer was heated at 70° C., and the coating liquid (1) for forming a liquid crystal layer was applied to the alignment layer using a bar (bar number: 18).

(Drying)

The coating liquid (1) for forming a liquid crystal layer applied to the alignment layer was dried in an oven at 70° C. for 1 minute to form a coating film (thickness: 10 μm, the content of the solvent in the coating film: 1% or less).

(Application of Shearing Force)

In a state where the coating film was heated to 70° C., and a stainless steel blade heated to 70° C. was brought into contact with the coating film. Next, while being in contact with the coating film, the blade was moved at a speed of 1.5 m/min. As a result, the shearing force was applied to the coating film. The moving distance of the blade was 30 mm. The shear rate was 2,500 sec$^{-1}$.

(Curing)

By irradiating the coating film to which the shearing force was applied with ultraviolet light (exposure amount: 500 mJ/cm$^2$) using a metal halide lamp in a nitrogen atmosphere (oxygen concentration: <100 ppm), the coating film was cured.

In the transparent screen prepared described above, the angle of the cholesteric helical axis was 20 degrees, and the helical pitch was 350 nm. In addition, in a case where the cholesteric layer was observed using a SEM image, it was verified that the pitch line derived from the cholesteric layer extended at 20 degrees with respect to the horizontal line and was corrugated in a gradual wave-like shape. In a case where projection light having a wavelength of 550 nm was incident into the transparent screen at 70 degrees with respect to the normal direction, it was verified that the light was scattered while being reflected and diffracted in a range of ±10 degrees with respect to the normal direction.

As a result, the transparent display according to the embodiment of the present invention can be prepared. The polarization of the incidence light is not particularly limited, but circularly polarized light (right circularly polarized light or left circularly polarized light) corresponding to a twisted direction (right-twisted or left-twisted) of circularly polarized light reflection of the cholesteric liquid crystal of the transparent screen is desirable. In addition, it is preferable that the circularly polarized light reflected from the cholesteric liquid crystal is in the first polarization state.

The transparent screen described above may be a front projector type where projector light is incident from an observer side or may be a rear projector type where projector light is incident from a side opposite to the observer. Even in this case, by appropriately adjusting, the angle of the helical axis, the helical pitch, and the in-plane distribution of the helical pitch, the visibility of a projection image can be improved.

In addition, in the transparent screen described above, reflection diffraction is used for the front projection, and transmission diffraction is used for the rear projection. In either case, first-order light or second-order light is desirably used regarding the order of diffraction. In addition, the main order of the diffracted light may change depending on wavelengths. For example, second-order light can be used as light in a blue region, and first-order light can be used as light in a green and red region. As a result, a problem of color break of display can be improved.

In addition, the transparent screen described above may diffract light other than visible light, for example, infrared light. As a result, a sensor function such as eye tracking can be imparted to the transparent screen.

In the virtual image display device according to the embodiment of the present invention, the position where the virtual image $V_1$ is displayed, that is, the floating distance of the virtual image $V_1$ can be adjusted by changing the separation distance between the transparent display and the half mirror, between the transparent display and the reflective polarizer, or between the half mirror and the reflective polarizer. Alternatively, the adjustment can be performed by changing the F number of a concave mirror in the half mirror and/or the reflective polarizer.

Hereinabove, the virtual image display device according to the embodiment of the present invention have been described in detail. However, the present invention is not limited to the above-described examples, and various improvements and modifications can be made within a range not departing from the scope of the present invention.

EXPLANATION OF REFERENCES 10, 10a to 10g: virtual image display device
12, 12a, 12c: half mirror
14, 14c: reflective polarizer
14a: reflective linear polarizer
14b: reflective circular polarizer
16: transparent display
16a: pixel
18: polarization separating element
24: $\lambda/4$ retardation layer
26: absorptive linear polarizer
30: support
32: alignment film
34: cholesteric liquid crystal layer
40: liquid crystal compound
40A: optical axis
41: support
42: reflecting surface
44: coating layer
50: infrared lighting device
52: infrared sensor
80: exposure device
82: laser
84: light source
86, 94: polarization beam splitter
90A, 90B: mirror
92: lens
96: $\lambda/4$ plate
$R_1$: light of scenery
$V_1$: virtual image
U: user
$O_1$: point
$\Lambda$: single period
D, $A_1$ to $A_3$: arrangement axis
M: laser light
MP: P polarized light
MS: S polarized light

What is claimed is:

1. A virtual image display device comprising:
a transparent display; and
an optical system that is disposed on a visible side with respect to the transparent display,
wherein the optical system includes a half mirror and a reflective polarizer,
at least one of the half mirror or the reflective polarizer has an action of a concave mirror,
a polarization separating element having a function of separating incident light into polarized light components orthogonal to each other is provided between the transparent display and the optical system, and
the polarization separating element includes any of an active retardation layer that is capable of switching a direction of a slow axis or a size of retardation, a patterned retardation layer that includes a plurality of two kinds of regions different in at least one of a direction of a slow axis or a size of retardation, an active linear polarizer that is capable of switching a direction of a transmission axis or an absorption axis, or a patterned polarizer that includes a plurality of two kinds of regions different in a direction of a transmission axis or an absorption axis.

2. The virtual image display device according to claim 1, wherein at least a part of a ray emitted from the transparent display is in a first polarization state immediately before being incident into the optical system, and
at least a part of the ray that is incident from a back surface of the transparent display and transmits through the transparent display is in a second polarization state orthogonal to the first polarization state immediately before being incident into the optical system.

3. The virtual image display device according to claim 2, wherein the first polarization state and the second polarization state are any of right circularly polarized light or left circularly polarized light.

4. The virtual image display device according to claim 1, wherein the reflective polarizer is a reflective linear polarizer, and
the optical system includes at least the half mirror, a $\lambda/4$ retardation layer, the reflective linear polarizer, and an absorptive linear polarizer in this order.

5. The virtual image display device according to claim 1, wherein the reflective polarizer is a reflective circular polarizer, and
the optical system includes at least the half mirror, the reflective circular polarizer, a $\lambda/4$ retardation layer, and an absorptive linear polarizer in this order.

6. The virtual image display device according to claim 1, wherein an infrared lighting device is provided on a back side of the transparent display, and
the infrared lighting device lights eyes of a user through the optical system.

7. The virtual image display device according to claim 1, wherein an infrared sensor is provided on a back side of the transparent display, and
the infrared sensor images eyes of a user through the optical system.

8. The virtual image display device according to claim 1, wherein the polarization separating element includes any of the active retardation layer,
the patterned retardation layer, or the patterned polarizer.

9. The virtual image display device according to claim 1, wherein the polarization separating element includes the patterned retardation layer or the patterned polarizer.

10. The virtual image display device according to claim 1, wherein the reflective polarizer is a liquid crystal diffraction element that includes a cholesteric liquid crystal layer having, in a radial shape, a liquid crystal alignment pattern in which a direction of an optical axis derived from a liquid crystal compound is continuously rotating in one in-plane direction in any of surfaces.

11. The virtual image display device according to claim 10,
wherein at least a part of a ray emitted from the transparent display is in a first polarization state immediately before being incident into the optical system, and
at least a part of the ray that is incident from a back surface of the transparent display and transmits through the transparent display is in a second polarization state orthogonal to the first polarization state immediately before being incident into the optical system.

12. The virtual image display device according to claim 11,
wherein the first polarization state and the second polarization state are any of right circularly polarized light or left circularly polarized light.

13. The virtual image display device according to claim 10,
wherein the reflective polarizer is a reflective linear polarizer, and
the optical system includes at least the half mirror, a $\lambda/4$ retardation layer, the reflective linear polarizer, and an absorptive linear polarizer in this order.

14. The virtual image display device according to claim 10,
wherein the reflective polarizer is a reflective circular polarizer, and
the optical system includes at least the half mirror, the reflective circular polarizer, a $\lambda/4$ retardation layer, and an absorptive linear polarizer in this order.

15. The virtual image display device according to claim 10,
wherein an infrared lighting device is provided on a back side of the transparent display, and
the infrared lighting device lights eyes of a user through the optical system.

16. The virtual image display device according to claim 10,
wherein an infrared sensor is provided on a back side of the transparent display, and
the infrared sensor images eyes of a user through the optical system.

* * * * *